United States Patent
Nevitt et al.

(10) Patent No.: US 7,385,763 B2
(45) Date of Patent: Jun. 10, 2008

(54) THICK FILM MULTILAYER REFLECTOR WITH TAILORED LAYER THICKNESS PROFILE

(75) Inventors: Timothy J. Nevitt, Red Wing, MN (US); Andrew J. Ouderkirk, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 147 days.

(21) Appl. No.: 11/109,212

(22) Filed: Apr. 18, 2005

(65) Prior Publication Data

US 2006/0232863 A1    Oct. 19, 2006

(51) Int. Cl.
G02B 1/10 (2006.01)
G02B 5/30 (2006.01)
G02B 27/28 (2006.01)
G02B 5/28 (2006.01)

(52) U.S. Cl. ........................ 359/584; 359/494; 359/589

(58) Field of Classification Search ................ 359/494, 359/495, 498, 584, 585, 586, 587, 588, 589; 349/105, 113
See application file for complete search history.

(56) References Cited

U.S. PATENT DOCUMENTS

| | | | |
|---|---|---|---|
| 4,525,413 A * | 6/1985 | Rogers et al. ............... 428/212 |
| 4,937,134 A | 6/1990 | Schrenk et al. | |
| 5,103,337 A | 4/1992 | Schrenk et al. | |
| 5,122,905 A | 6/1992 | Wheatley et al. | |
| 5,122,906 A | 6/1992 | Wheatley | |
| 5,126,880 A | 6/1992 | Wheatley et al. | |
| 5,360,659 A | 11/1994 | Arends et al. | |
| 5,448,404 A | 9/1995 | Schrenk et al. | |
| 5,486,949 A | 1/1996 | Schrenk et al. | |
| 5,540,978 A | 7/1996 | Schrenk | |
| 5,568,316 A | 10/1996 | Schrenk et al. | |
| 5,808,798 A | 9/1998 | Weber et al. | |
| 5,867,316 A | 2/1999 | Carlson et al. | |
| 5,872,653 A * | 2/1999 | Schrenk et al. ............. 359/498 |
| 5,882,774 A | 3/1999 | Jonza et al. | |
| 5,968,666 A | 10/1999 | Carter et al. | |
| 6,113,811 A | 9/2000 | Kausch et al. | |
| 6,157,490 A | 12/2000 | Wheatley et al. | |
| 6,207,260 B1 | 3/2001 | Wheatley et al. | |
| 6,335,051 B1 | 1/2002 | Kausch et al. | |
| 6,368,699 B1 | 4/2002 | Gilbert et al. | |
| 6,531,230 B1 | 3/2003 | Weber et al. | |

(Continued)

FOREIGN PATENT DOCUMENTS

WO    WO 95/17303    6/1995

OTHER PUBLICATIONS

U.S. Appl. No. 60/672,964 entitled "Multifunctional Thick Film Reflective Polarizer For Displays", filed Apr. 18, 2005.

*Primary Examiner*—Alessandro Amari

(57) ABSTRACT

A multilayer reflector useable to reflect or transmit light over the visible wavelength range includes optically thick constituent layers. The optical thickness of the constituent layers through the thickness of the reflector defines a layer thickness profile. The layers are arranged so that the thickness profile has a tailored non-uniform distribution, such as a graded distribution or a randomized distribution. The layers desirably have an optical thickness in a range from about one to five or one to ten design wavelengths. The reflector can be a polarizer, reflecting only one normally incident polarization state, or a mirror, reflecting two normally incident orthogonal polarization states.

32 Claims, 16 Drawing Sheets

U.S. PATENT DOCUMENTS

| | | |
|---|---|---|
| 6,583,930 B1 | 6/2003 | Schrenk et al. |
| 6,590,707 B1 * | 7/2003 | Weber ........................ 359/498 |
| 6,610,356 B2 | 8/2003 | Kausch et al. |
| 6,827,886 B2 | 12/2004 | Neavin et al. |
| 2002/0180107 A1 | 12/2002 | Jackson et al. |
| 2002/0190406 A1 | 12/2002 | Merrill et al. |
| 2004/0099992 A1 | 5/2004 | Merrill et al. |
| 2004/0099993 A1 | 5/2004 | Jackson et al. |

* cited by examiner

THICK FILM MULTILAYER REFLECTOR WITH TAILORED LAYER THICKNESS PROFILE

FIELD OF THE INVENTION

The present invention relates to reflective optical bodies including but not limited to films, sheets, and plates, particularly those used in visible light applications such as liquid crystal display (LCD) devices and other electronic display devices, as well as to methods of making and using such optical bodies.

BACKGROUND

Thin film multilayer reflectors suitable for reflecting visible or near-visible light are known. Such reflectors have long been made by evaporating thin films of different inorganic dielectric light-transmissive materials in succession on a glass substrate in a vacuum chamber. The different refractive indices of adjacent layers form tens or hundreds of interfaces, each of which reflects light by Fresnel reflection, and coherent constructive or destructive interference of reflected light components provides the reflector with its reflection and transmission properties. It is also know to make thin film multilayer reflectors by an extrusion process in which a multitude of alternating light-transmissive polymer materials are coextruded through a die, optionally passed through one or more layer multipliers, then cast onto a casting wheel or surface, and subsequently uniaxially or biaxially stretched. Such a technique can be used to make all-polymeric thin film reflective optical bodies, such as reflective polarizing films and reflective mirror films. See, for example, U.S. Pat. No. 5,486,949 (Schrenk et al.); U.S. Pat. No. 5,882,774 (Jonza et al.); U.S. Pat. No. 6,531,230 (Weber et al.); and U.S. Pat. No. 6,827,886 (Neavin et al.). In contrast to vacuum-coated inorganic dielectric thin film stacks, the multilayer reflectors made by polymer coextrusion techniques do not require a separate substrate for formation or handling.

Because of their reliance on coherent constructive or destructive interference of light from neighboring layer interfaces, and because such constructive or destructive interference is a strong function of the individual layer thicknesses, as well as other geometric factors, great care is typically needed to ensure that the layers are controlled to within a narrow tolerance of a design goal to ensure proper operation of the thin film interference device. As the physical size of the thin film device increases—such as for polymeric thin film reflective polarizers or broadband mirrors used in LCD devices, where the demand for larger screen sizes continues to grow—the need for such layer control can be even more important. Increasing the physical size of thin film reflective polarizers and mirrors that are manufactured in the form of thin, flexible all polymeric sheets or films also magnifies potential mechanical problems such as wrinkling, warping, and delamination.

Certain "thick film" multilayer reflectors are also known. These reflectors, which are generally associated with incoherent light reflection, are variously defined in the literature, for example, structures whose individual layers have an optical thickness of at least 0.45 micrometers, or structures whose individual layers have an average optical thickness of at least 5/4 times the average wavelength of light to be reflected. In any case, principles of incoherent light reflection inform the skilled artisan that, for most practical situations, thick film multilayer reflectors have peak reflectivities well below those achievable by their thin film counterparts, and thus the former are often considered inferior to the latter. Further, several references suggest that thick film multilayer stacks provide incoherent light reflection regardless of how thick the individual layers are, and that the layer thicknesses of a thick film multilayer stack have substantially no effect on such a stack's reflectivity.

BRIEF SUMMARY

We have found that the layer thickness and the layer thickness profile of thick film multilayer reflectors can have a substantial effect on optical performance in the wavelength range of interest, such as the visible region. In effect, certain multilayer constructions that would be expected to provide smooth incoherent light reflection because of the relatively thick nature of the individual layers, have been found to produce substantial variability in reflection and transmission characteristics, even when averaging those characteristics using a suitable bandwidth smoothing filter. Such variability can have deleterious consequences in some applications.

The present application therefore teaches, inter alia, that in order to provide desirable optical performance, such as more uniform reflection and/or transmission characteristics, the layer thickness profile even of a thick film multilayer reflector can be modified or tailored to achieve such characteristics. In particular, more uniform characteristics can be achieved by making non-uniform the optical thickness distribution of the individual layers that make up the reflector. Exemplary non-uniform distributions include graded distributions and randomized distributions. In this regard, the term "randomized", "random", and the like includes but is not limited to a purely statistical definition, and also includes arrangements of layer optical thickness that are mixed or scrambled to the extent that little or no regular patterns are formed. We have found that tailored non-uniform distributions can be particularly effective for multilayer reflectors whose individual layer optical thicknesses are moderately thick, meaning having a thickness from about 5/4 to about 5 or 10 times the wavelength of interest.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended figures, wherein like reference numerals designate like elements, and wherein.

DETAILED DESCRIPTION OF THE ILLUSTRATIVE EMBODIMENTS

Figure 1:
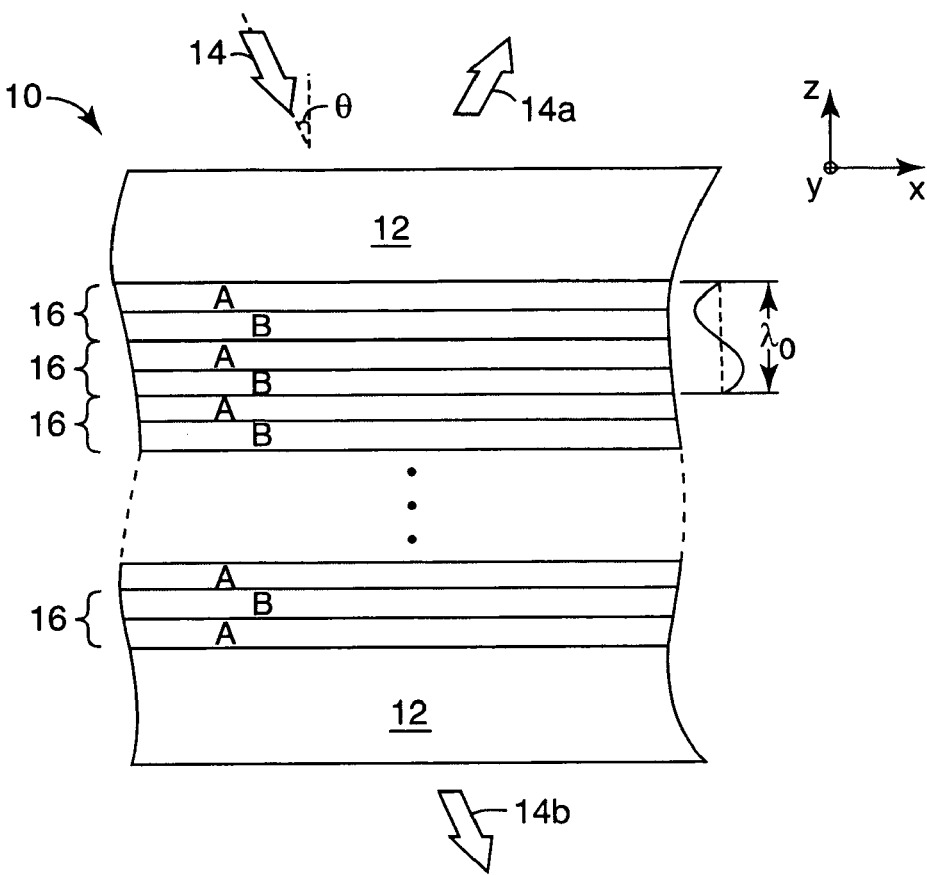
FIG. 1 is a schematic cross-sectional view of a conventional quarter-wave thin film multilayer reflector.

FIG. 1 shows a portion of a conventional thin film multilayer reflector 10. Reflector 10 is all polymeric and has a stack or packet of optically thin layers sandwiched between optically thick outer skin layers 12. The layer thicknesses shown in the figure are intended to be representative of optical thickness, as described below, rather than physical thickness. The reflector 10 is shown in relation to a Cartesian x-y-z coordinate system, with the z-axis corresponding to a thickness axis of the reflector and the x- and y-axes extending parallel to the plane of the layers and the interfaces between layers. Arrow 14 represents light incident on the film at an angle θ relative to the z-axis, with reflected light represented by arrow 14*a* and transmitted light by arrow 14*b*.

In the finished product, the optically thin layers are conventionally arranged in a repeating pattern along the z-axis of the reflector. The smallest unit of the repeating pattern is referred to as a unit cell or optical repeat unit. In a simple quarter-wave stack (see again FIG. 1), "A" layers composed of one material are interspersed with "B" layers composed of a different material, making the pair "AB" the optical repeat unit 16. In other cases the optical repeat unit can be more complex, such as a four-layer repeat unit (ABCB) as discussed in U.S. Pat. No. 5,103,337 (Schrenk et al.), or a six-layer repeat unit (7A1B1A7B1A1B) as discussed in U.S. Pat. No. 5,360,659 (Arends et al.).

The individual layers of these films have optical thicknesses—defined as the physical thickness multiplied by the appropriate refractive index of the individual layer—of less than a design wavelength of light $\lambda_0$, such that constructive or destructive interference for light components reflected at the interfaces between individual layers can occur coherently to produce the desired overall reflectivity at $\lambda_0$. More specifically, the optical thickness of each optical repeat unit, which equals the sum of the optical thicknesses of its component layers, corresponds to one-half of the design wavelength. In the reflector 10 of FIG. 1, each optically thin A and B layer is nominally a quarter-wave thick, or about $\lambda_0/4$.

Figure 2:
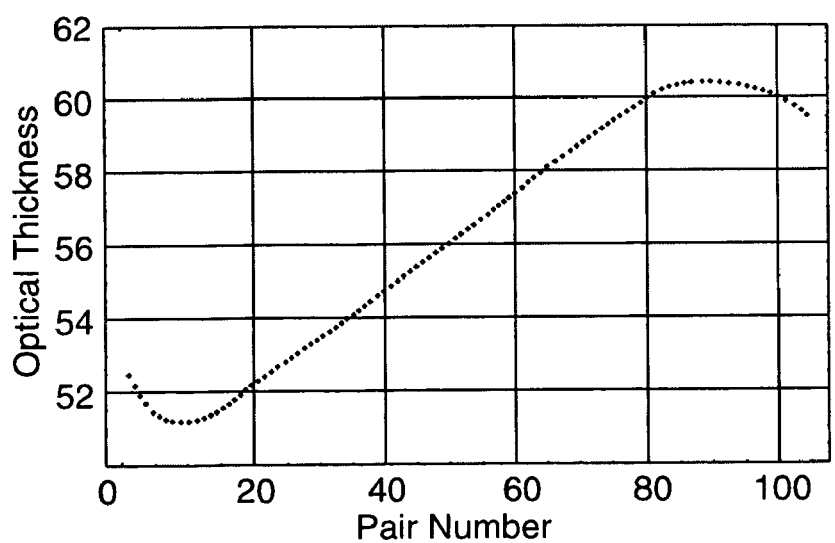
FIG. 2 is a graph of a graded layer thickness profile for a conventional thin-film multilayer reflector.

Thin film reflectors can utilize a variety of layer thickness profiles, for example, a thickness gradient, such that the optical thickness of the optical repeat units changes along a thickness axis of the stack in a prescribed manner, in order to achieve desired reflectivity characteristics such as expanding the spectral width of a reflectance band or sharpening the transition edge of such a band. See, e.g., U.S. Pat. No. 6,583,930 (Schrenk et al.) and U.S. Pat. No. 6,157,490 (Wheatley et al.). FIG. 2 shows an example of such a profile, where the horizontal axis plots the number of the individual optical repeat units counted from one side of the multilayer stack to the other, and the vertical axis plots optical thickness of the corresponding optical repeat unit.

Because of their reliance on coherent constructive or destructive interference of light from neighboring layer interfaces, and because such constructive or destructive interference is intimately related to geometrical factors of the illuminated optical body such as layer thickness profile, angle of incidence, polarization, wavelength, and the like, thin film multilayer reflectors can exhibit substantial variability in reflectivity and transmission as a function of these factors. In some cases this variability is not only desirable but necessary for the intended application. In other cases at least some of the variability may be undesirable. As mentioned previously, the known sensitivity of thin film multilayer stacks to individual layer thickness also requires manufacturers to ensure precise thickness control of such stacks.

Optically thick film multilayer reflectors differ from their thin film counterparts in that the individual layers are so thick that a first and second light component reflecting from adjacent interfaces in the optical body presumably combine substantially incoherently from the standpoint of the wavelength of interest. One example is the "pile-of-plates" polarizer. Where the wavelength of interest is human-visible light, for example, this means that, for a visible light ray or beam that impinges upon two adjacent interfaces to produce two corresponding reflected and transmitted light components, an observer viewing the resulting reflected or transmitted light will notice no change in brightness or color (spectral distribution) of the observed light if the layer thickness is varied a small amount. See also, for example, U.S. Pat. No. 5,122,905 (Wheatley et al.), which states in connection with an optically thick multilayer reflector that "the individual layers should have an optical thickness such that no visibly perceived iridescence is reflected from the body". The '905 Wheatley reference describes thick layers as those whose optical thickness is at least 0.45 micrometers. As another example, U.S. Pat. No. 5,808,798 (Weber et al.) describes a "pile of plates" or "thick film" stack of alternating layers of materials A and B in which the average optical thickness of the layers in the stack is at least 5/4 times the average wavelength of the light to be reflected.

Because of the nature of incoherent light interaction, it has been proposed that layer thickness and the layer thickness profile has substantially no effect on the performance of a thick film multilayer reflector. The '905 Wheatley et al. reference states, for example:

"Thus, the reflected wavelength of light from the multilayer polymeric body of the present invention is independent of both individual layer and total structure thickness over a wide processing range so long as a substantial majority of the individual layers has an optical thickness equal to or greater than about 0.45 micrometers. Uniformity of reflection is inherent in the design of the body. Moreover, a gradient of layer thickness through the thickness of the body is neither detrimental nor advantageous to the appearance of the body as long as a substantial majority of the individual layers of the polymers maintains an optical thickness equal to or greater than about 0.45 micrometers."

As another example, the '798 Weber et al. reference states in connection with a nonpolarizing beamsplitter comprising a "pile of plates" or "thick film" stack, that such a stack has "no wavelength selectivity", and a ratio of p-polarization reflectivity $R_p$ to s-polarization reflectivity $R_s$ "is determined by material properties only, and cannot be significantly affected by layer thickness."

Figure 3:
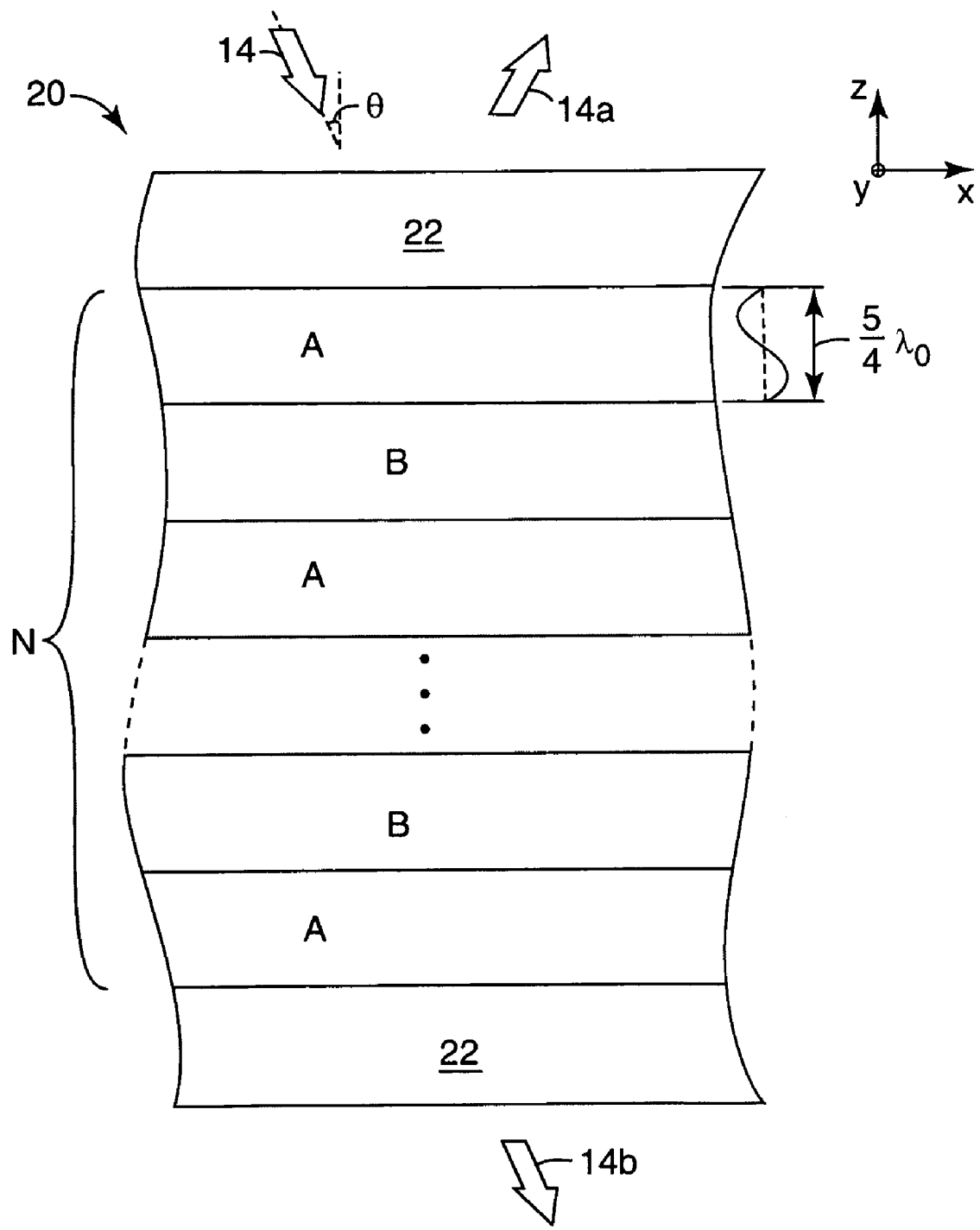
FIG. 3 is a schematic cross-sectional view of a thick film multilayer reflector.

A portion of a thick film multilayer reflector 20 is shown schematically in FIG. 3, where layer thickness is again depicted as an optical thickness rather than a physical thickness. The figure shows a central group of N light-transmissive layers bounded by outer light-transmissive layers 22, for a total of N+2 layers. In some cases the outer layers 22 may be distinguishable in some way from the central N layers. For example, the central N layers may consist essentially of two alternating coextruded light-transmissive polymer materials A,B, and the outer layers may both be made of a different light-transmissive polymer material selected for its optical, mechanical, or chemical properties. See, e.g., U.S. Pat. No. 6,368,699 (Gilbert et al.). The outer layers 22 may, for instance, provide scratch resistance via a hard coating composition, UV protection via ultraviolet absorbers or inhibitors in a matrix material, antistatic properties, slip properties via slip agents, appearance-modifying properties via diffusing agents, colorants, dyes, pigments, and the like, adhesion via heat activated or pressure sensitive adhesive compositions, and/or warp resistance. The outer layers 22 may also have thicknesses substantially different from that of the central N layers, whether substantially thinner or substantially thicker. Alternatively, the outer layers 22 may be indistinguishable from the central N layers, in which case they are simply the endpoints of a pattern established by the other layers. One or both of outer layers 22 may also be omitted. Although the reflector 20 can be composed of as many light transmissive materials as the number of constituent layers in the reflector (e.g. N,N+1, or N+2), with no two layers having the same composition, it is usually more practical to arrange two, three, or another small number of light-transmissive materials in an alternating fashion such as . . . ABAB . . . or . . . ABCABC . . . or the like.

Each layer has refractive indices for light polarized along the x-, y-, and z-axis of $n_x$, $n_y$, and $n_z$ respectively. Differences in refractive index between adjacent layers along these axes, which differences may in general be zero or nonzero, are $\Delta n_x$, $\Delta n_y$, and $\Delta n_z$, respectively. For a reflective polarizer, $\Delta n_y$ is zero or has a magnitude small relative to that of $\Delta n_x$, where one can use the arbitrary convention of assigning the x-axis to the direction of maximum in-plane refractive index difference. In that case the x-axis corresponds to the block axis of the polarizer and the y-axis corresponds to the pass axis. In polymeric constructions it is often convenient to make the polarizer with "A" layers that develop stress-induced birefringence during stretching and "B" layers that remain isotropic. This is not, however, a requirement, since it is also possible for both layer types to develop stress-induced birefringence, as long as one in-plane refractive index difference ($\Delta n_x$) between adjacent layers is significantly greater than another in-plane index difference ($\Delta n_y$).

In FIG. 3, the individual layers are shown as having optical thicknesses somewhat greater than the design wavelength $\lambda_0$, for example, $(5/4)\lambda_0$ or more, and at any rate of a thickness that would be considered optically thick by the person of ordinary skill in the art. At least some of the layer thicknesses can also be on the order of $\lambda_0$ or even less, and some, most, or substantially all can be greater than $(5/4)\lambda_0$, or greater than $2\lambda_0$, $5\lambda_0$, or $10\lambda_0$ or more, with no strict upper limit. In some cases it may also be desirable to combine one or more thick film stack with one or more thin film stack (such as a quarter-wave interference stack) to make a hybrid multilayer reflective body. Thick film multilayer reflectors can also be described as those having a number N of individual layers whose optical thicknesses, or the average thereof, are at least $(5/4)\lambda_0$, and N is large enough such that these optically thick layers contribute substantially to the reflectivity and/or transmission of the reflector. For example, the number N may be large enough that the optically thick layers are responsible for at least half of the reflectivity at the design wavelength $\lambda_0$, or even for substantially all of the reflectivity at the design wavelength. As will be seen below, an optical thickness range of particular interest is from about $(5/4)\lambda_0$ to about $5\lambda_0$ or $10\lambda_0$, where for operation over the entire visible spectrum the design wavelength $\lambda_0$ can be taken to be approximately in the middle of the visible region (about 550 nanometers) or can be taken as a long wavelength end of the visible region (e.g., approximately 700 nm). Thick film layers whose optical thickness is in this range are referred to herein as being moderately thick.

The disclosed reflectors are capable of reflecting a substantial amount of light of at least one polarization over substantially the entire visible spectrum. For example, the disclosed reflectors desirably have a normal incidence average reflectivity for at least one polarization state from about 400-700 nm of at least about 30%, 40%, or even 45%. This can be accomplished by controlling the refractive index relationships of the individual light-transmissive layers to achieve sufficiently high refractive index differences between layers, in combination with ensuring a sufficient number N of such layers in the stack.

In a process of designing a thick film multilayer reflector, the individual layer thicknesses may be determined or calculated by first specifying a desired overall thickness of the finished multilayer reflector and a desired reflectivity or transmissivity of the reflector, provided the specific light-transmissive polymer materials have predictable refractive index characteristics. Depending on whether the desired reflector is to be made with a uniaxial stretching process (whether constrained or unconstrained, in order to make, for example, a polarizer that substantially reflects one polarization state of normally incident light and substantially transmits the orthogonal polarization state) or with a biaxial stretching process (in order to make, for example, a balanced mirror that reflects orthogonal polarization states of normally incident light substantially equally, or an unbalanced mirror), then details of the stretching process and knowledge of the polymer material properties will inform the designer what layer-to-layer refractive index differences can be expected under those processing conditions. With the refractive index information, the number of layers N needed to provide a desired reflectivity, for example, can then be estimated. Then, if the reflector has a target overall physical thickness D, for example in the range from 1 to 10 mm or even from 1 to 4 mm so as to achieve relative mechanical stiffness but in a relatively low profile plate, then the nominal physical thickness of the individual layers can be estimated at D/N. Alternatively, if it is desired to make as thin a reflector as possible, a nominal optical thickness on the order of about $(5/4)\lambda_0$ can be selected, resulting in an overall physical thickness for the reflector on the order of about $(5N\lambda_0)/(4n)$, where n is an average refractive index of the different light-transmissive materials used for the various layers.

Figure 4A:
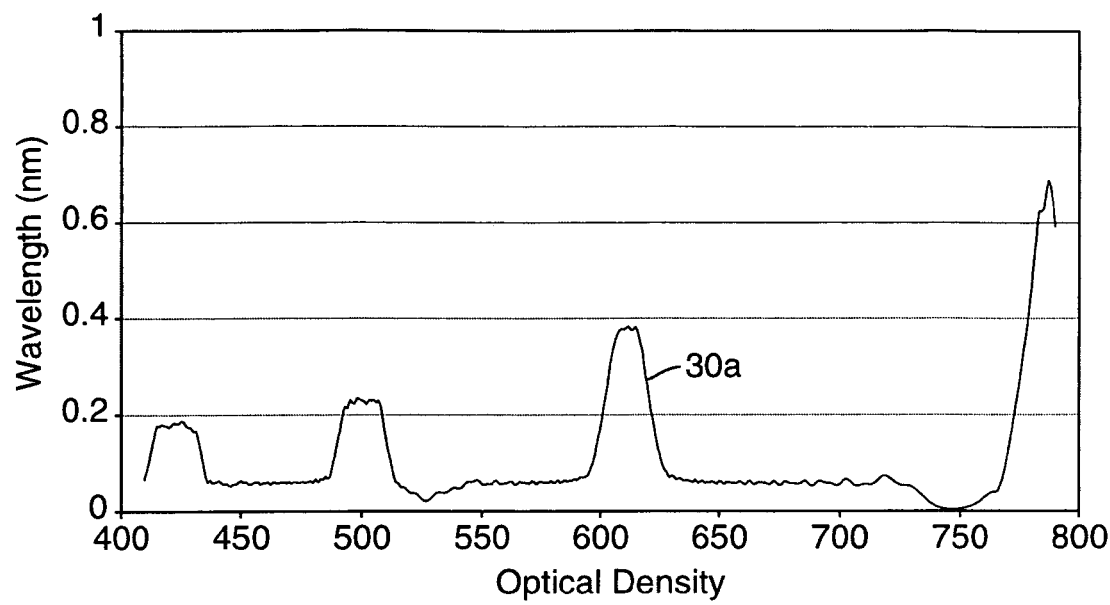
FIG. 4a is a graph of modeled transmission, plotted as optical density, versus wavelength for a thick film multilayer reflector having a uniform layer thickness distribution.
Figure 4B:
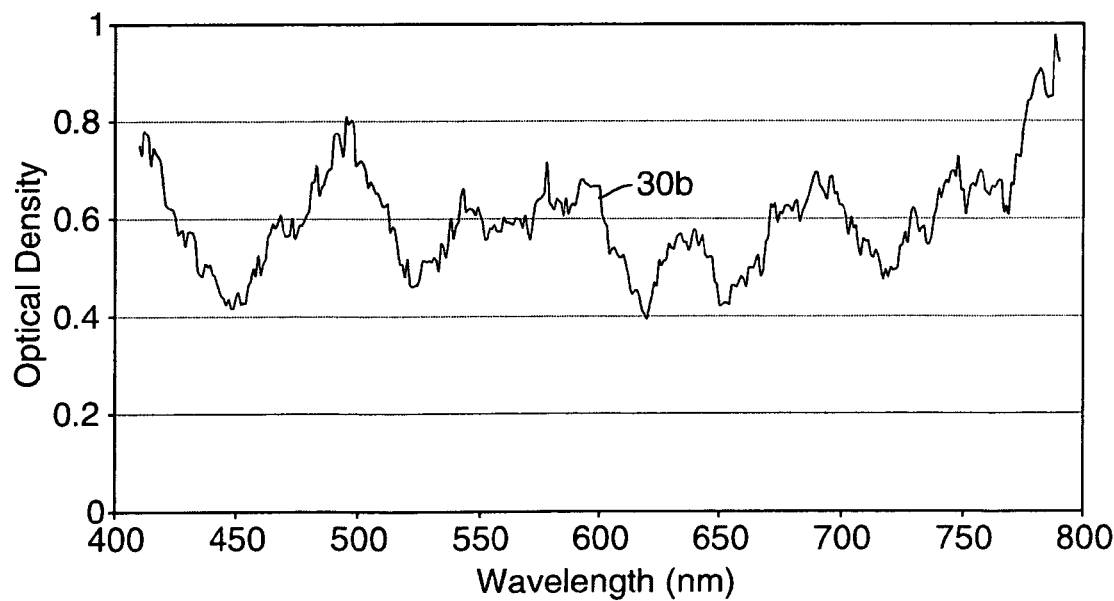
FIG. 4b is a graph of modeled transmission, plotted as optical density, versus wavelength for a thick film multilayer reflector having a non-uniform layer thickness distribution.
Figure 5A:
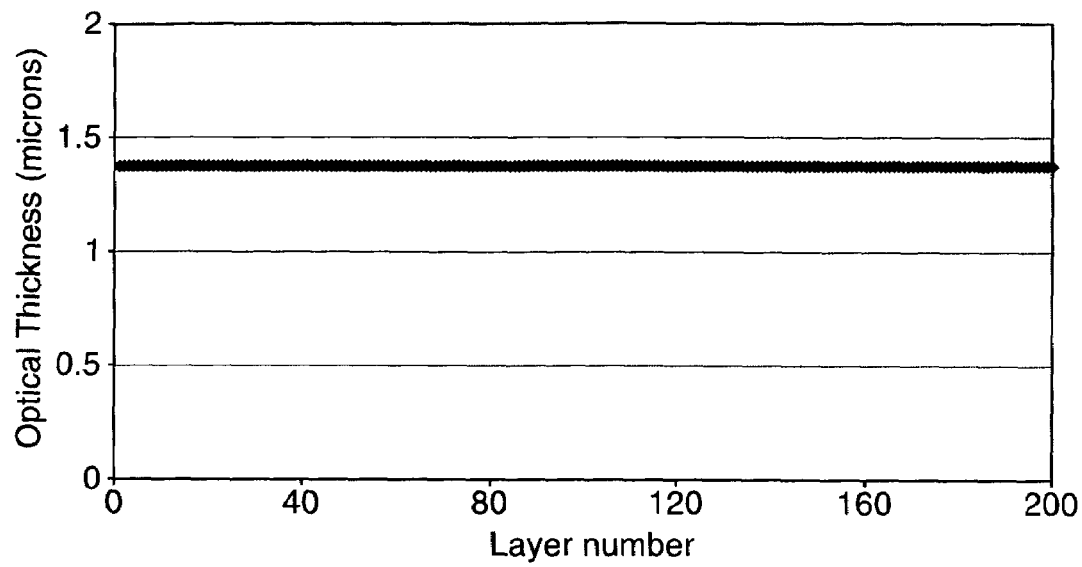
FIGS. 5a and 5b are layer thickness profiles of the thick film multilayer reflectors associated with the optical density data of FIGS. 4a and 4b, respectively.

FIGS. 4a and 4b demonstrate the sensitivity of thick film multilayer reflectors to the layer thickness distribution. Data in these figures was generated using TFCalc, an optical design software package available from Software Spectra, Inc. of Portland, Oreg. The figures plot optical density versus wavelength, where optical density or OD=$\log_{10}(1/T)$, and T is transmission on a scale of 0 (perfectly absorbing or otherwise non-transmitting) to 1 (perfectly transmitting). A bandwidth smoothing filter of bandwidth $\Delta\lambda$=20 nm was also used, such that the value of T at each wavelength $\lambda$ was calculated as an average over a 20 nm wavelength band centered on $\lambda$. This smoothing filter is used to ensure that modeled transmission variations are meaningful from the standpoint of a human observer. Smoothing filters with different bandwidths $\Delta\lambda$ greater or less than 20 nm may also be used. In some cases, such as where the thick film reflector is combined in a system with a very narrow band source or other component, it may be appropriate to use a bandwidth $\Delta\lambda$ of 1 nm or less, or no smoothing filter at all. Beyond this, curve 30a in FIG. 4a assumes the following parameters:

- a stack consisting of exactly 200 layers (N=200);
- each layer of the stack has an optical thickness of 1.375 micrometers (hence about $2.5\lambda_0$, where $\lambda_0$=550 nm.). The thickness profile of the stack is uniform, as shown in FIG. 5a;
- the layers are arranged in an alternating AB pattern, with half the layers having an in-plane refractive index of 1.85 and the other half having an in-plane refractive index of 1.56. These values are representative of a uniaxially stretched alternating PEN/coPEN reflective polarizer construction, where the stretch is unconstrained to permit complete relaxation of the optical body in the y- and z-directions, assuming stretching is along the x-direction, so that $\Delta n_x$=0.19 and $\Delta n_y$=$\Delta n_z$=0. The layers are assumed to have no absorption, hence at any given wavelength, transmission plus reflection equals 100% (T+R=100%);
- the stack is immersed in air, with index of refraction of 1.0; and
- light is incident normally on the stack, thus $\theta$=0.

Where the stack is a reflective polarizer, the curve 30a represents the optical density of a polarization state associated with the stated 1.85/1.56 refractive indices of the layers, e.g. light polarized along the x-axis. Alternatively, if the stack were a balanced mirror for which $\Delta n_x$=$\Delta n_y$=0.19, curve 30a would represent the optical density of x-polarized, y-polarized, and unpolarized normally incident light.

As seen in the graph, curve 30a exhibits a low baseline optical density of less than 0.1, with three peaks in the visible region, each less than 0.4 optical density, that result from three narrow reflection peaks. The variability in optical density over the visible region from 410-700 nm can be seen to have a magnitude between 0.3 and 0.4, but the corresponding smoothed percent reflectivity (not shown) varies greatly over that visible region, ranging from a low of 5% (optical density 0.02) to a high of 59% (optical density 0.38), and averaging 19%, with corresponding variability in smoothed percent transmission.

Figure 5B:
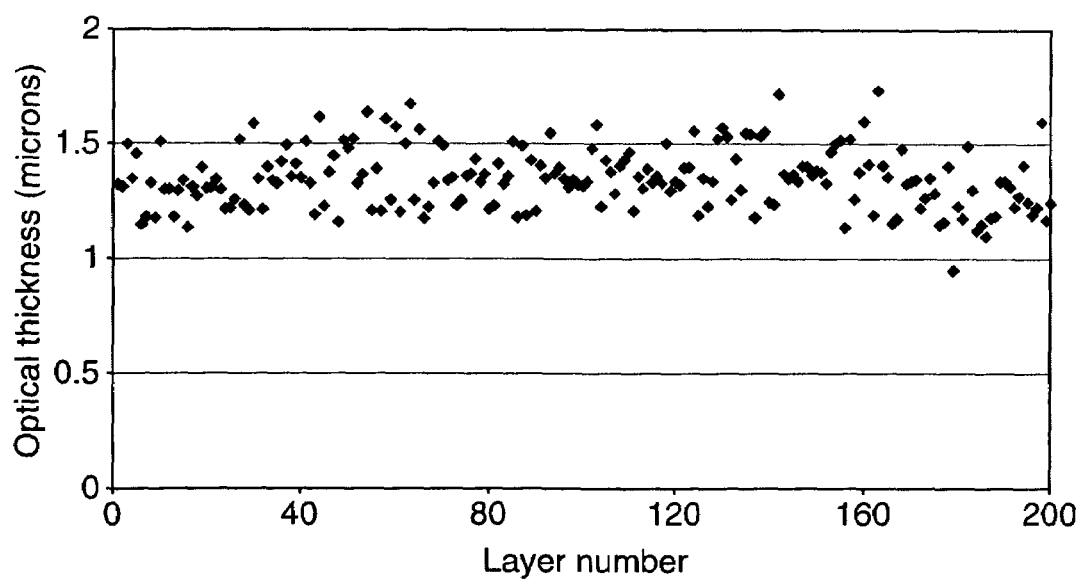

The initially uniform layer thickness distribution was then modified using an optimization routine (variable metric method) to increase the average optical density over the visible region from 400-700 nm. All other parameters used in connection with curve 30a were the same. The modified layer thickness distribution is shown in FIG. 5b. This modified distribution is characterized by a minimum, maximum, and average optical thickness of 0.95, 1.74, and 1.35 micrometers respectively, corresponding to about 1.7, 3.2, and $2.5\lambda_0$, where $\lambda_0$=550 nm. The average optical thickness differed slightly from that of FIG. 5a because the optimization routine was allowed to adjust optical thickness of each of the 200 layers without requiring the average layer thickness to remain constant.

The optical behavior of the modified layer thickness distribution is shown by curve 30b in FIG. 4b. As intended, the optical density averaged over the visible range is increased for the modified multilayer optical body: average optical density from 410-700 nm is 0.58 for curve 30b, and 0.10 for curve 30a. As a further benefit, the smoothed percent reflectivity and transmission (not shown) associated with curve 30b exhibit substantially less variability over visible wavelengths than those associated with curve 30a. The smoothed percent reflectivity associated with curve 30b ranged, over the 410-700 nm region, from a low of 60% (optical density 0.39) to a high of 84% (optical density 0.80), and averaging 73%, compared with the range from 5 to 59% mentioned above for curve 30a.

The increased average optical density and decreased variability in smoothed percent reflectivity and transmission is achieved by changing the uniform layer thickness distribution of FIG. 5a to the non-uniform, randomized distribution of FIG. 5b. In this regard, the term "randomized" is not intended to be limited to a strictly statistical definition, but also include arrangements of layer optical thickness that are mixed or scrambled to the extent that little or no regular patterns are formed. One can, for example, divide the entire layer thickness profile into segments, such as thirds, quarters, fifths, or tenths, and calculate the average optical or physical thickness of the layers in each of the segments. For many randomized distributions the average thickness of the different segments will be substantially the same. For example, the average thickness of a given segment may differ from the average thicknesses of each of the remaining segments by no more than the amplitude or the standard deviation of thickness variation in the given segment. Further, the minimum or maximum layer thickness of a given segment may be less than or greater than (respectively) the average thickness of all of the remaining segments.

Reducing transmission and reflection variability as a function of wavelength, particularly where the transmission and reflection data has been smoothed by averaging over a visually meaningful spectral width $\Delta\lambda$ such as 10, 20, or even 50 nm, reduces the amount of noticeable color that the reflector provides to the display or other system in which it is used.

Reducing transmission and reflection variability can also be important when using the reflector in narrow band applications, for example, applications that utilize narrow band components such as narrow band sources, detectors, or filters. By "narrow band" we mean a band that is narrow relative to the visible wavelength spectrum. In some cases such a band may have a full-width-at-half-maximum (FWHM) spectral width on the order of about 50, 20, or even 10 nm or less, and in some cases may be on the order of about 5, 2, or even 1 nm or less. Furthermore, we mean not only components that operate in only one such narrow band, such as a single mode laser light source, but also components that operate over a plurality of distinct narrow bands such as certain cold cathode fluorescent lamp white light sources that emit over the visible wavelength range but in a plurality of discrete narrow bands, or a high finesse Fabry-Perot filter element. When such narrow band sources or other components are used with a conventional thick multilayer reflector, small spectral shifts or variations can lead to extreme changes in system behavior as, for example, the narrow band emission from a narrow band source aligns itself with a local minimum and then with a local maximum in transmission or reflection. Such spectral shifts or variations may be due to any one or a combination of unit-to-unit variability, angular effects, thermal effects, spatial nonuniformities (e.g. caliper variations) of the multilayer reflector, or the like, and they may not be apparent by a cursory visual inspection of the thick multilayer reflector under normal lighting conditions, particularly if the variability occurs over a wavelength scale too small for human visual detection. By tailoring the layer thickness profile to reduce the spectral variability of the multilayer reflector, such extreme system changes can likewise be reduced.

Figure 6:
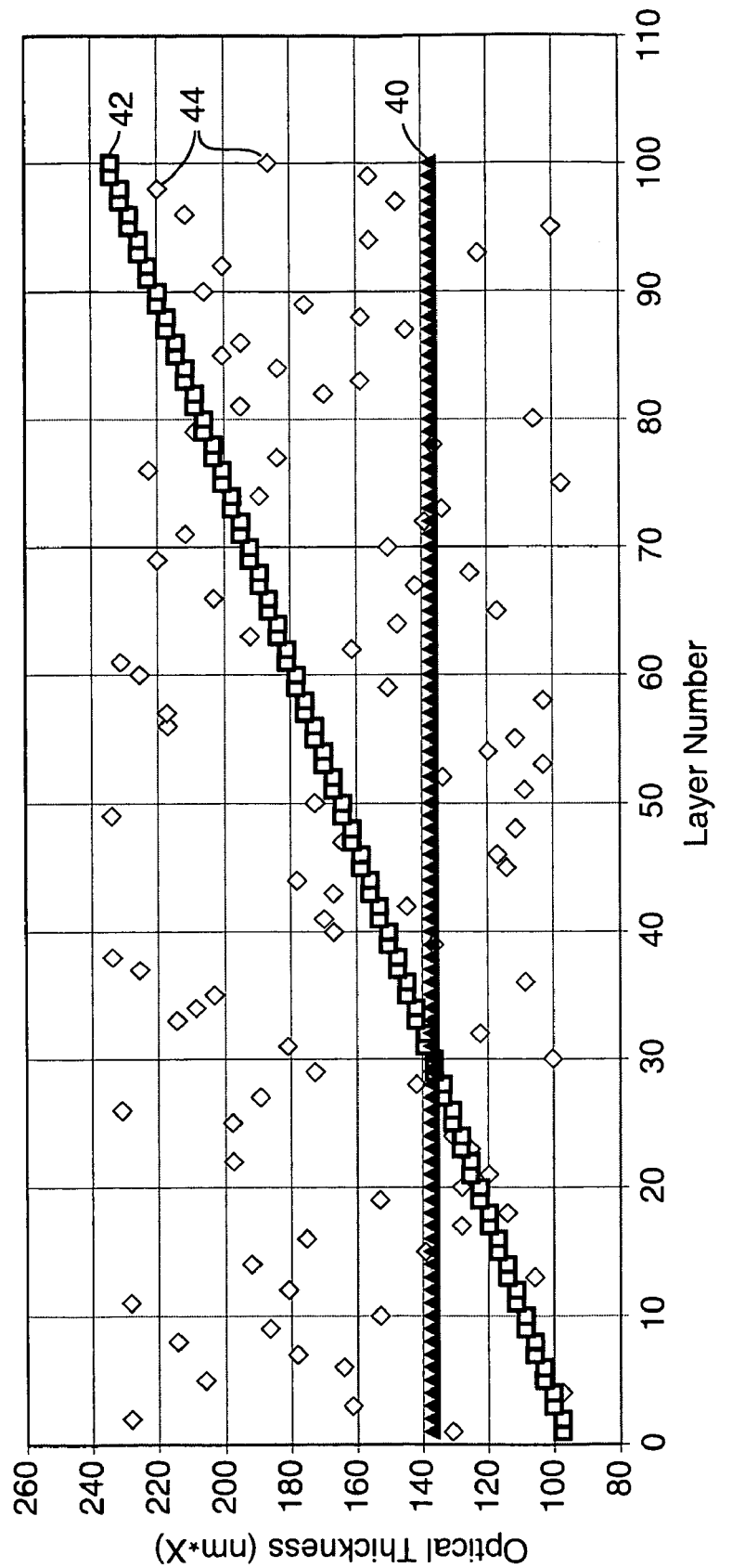
FIG. 6 is a graph of three layer thickness profiles, one uniform, one graded, and one randomized, each such profile consisting of N=100 light-transmissive layers.

Turning now to FIG. 6, we see there a graph of optical thickness versus layer number for a uniform layer distribution 40 plotted with square-shaped points, a graded layer distribution 42 plotted with square-shaped points, and a randomized layer distribution 44 plotted with diamond-shaped points. Each distribution 40, 42, 44 has 100 points, hence N=100 total layers for the associated multilayer reflectors. Furthermore, distribution 40 has an average (and uniform) layer optical thickness of 137.5 units ($\approx$550/4), while distributions 42 and 44 have slightly higher average layer optical thicknesses of 165.7 units ($\approx$650/4). Still further, each point of the random distribution 44 has a one-to-one correspondence with a point of the graded distribution 42. That is, the layers in distribution 44 are the very same layers as those of distribution 42 except their order in the stack has been shuffled or mixed to produce the random distribution. Each of the three distributions, however, maintains an alternating AB repeat pattern throughout the stack. In the modeling, half the layers (the "A" layers) had a high refractive index of 1.84, the other half ("B" layers) had a low refractive index of 1.56. These indices are for light polarized along an in-plane x-axis, and are again typical of an unconstrained uniaxially stretched PEN/coPEN two-polymer system. The refractive indices for the mutually perpendicular y- and z-axes can all equal 1.56, or can have other values, but had no effect on the modeling that was performed. The model further assumed that the layers had no absorption, and that the stack was immersed in air, and that light impinged normally on the reflector.

The unit of length for optical thickness on the vertical axis of FIG. 6 is shown as having a scale factor, labeled "X". The variable X can thus be used as a multiplier to investigate the impact of overall layer thickness or dimension on the effect of randomizing the layer thickness distribution. For example, for X=1 or X=10, the layer distribution 40, has an average optical thickness of 137.5 nm or 1,375 nm, respectively, while distributions 42, 44 each have an average optical thickness of 165.7 nm or 1,657 nm, respectively.

Figure 7A:
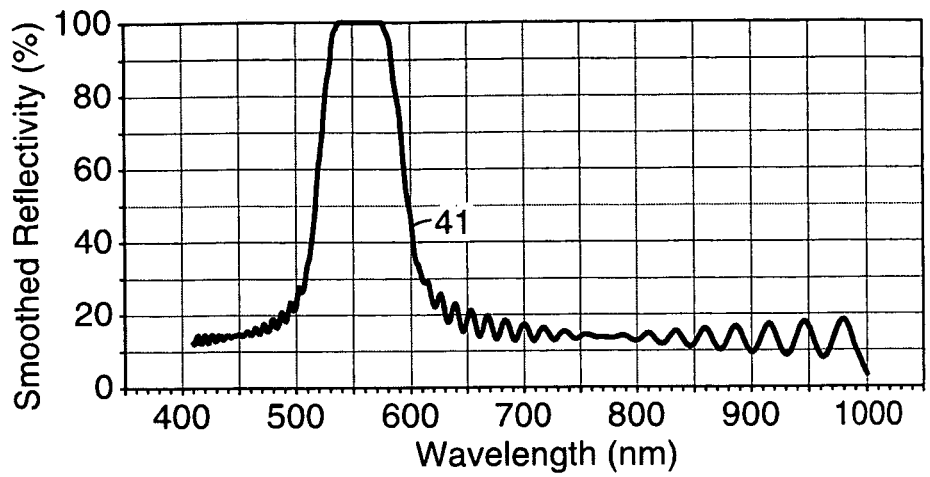
FIGS. 7*a-c* are graphs of modeled reflectivity of normally incident block state light versus wavelength for the thickness profiles of FIG. 6, for a thickness scale factor X=1, where the reflectivity data has been spectrally smoothed with a 20 nm wide running average.
Figure 7B:
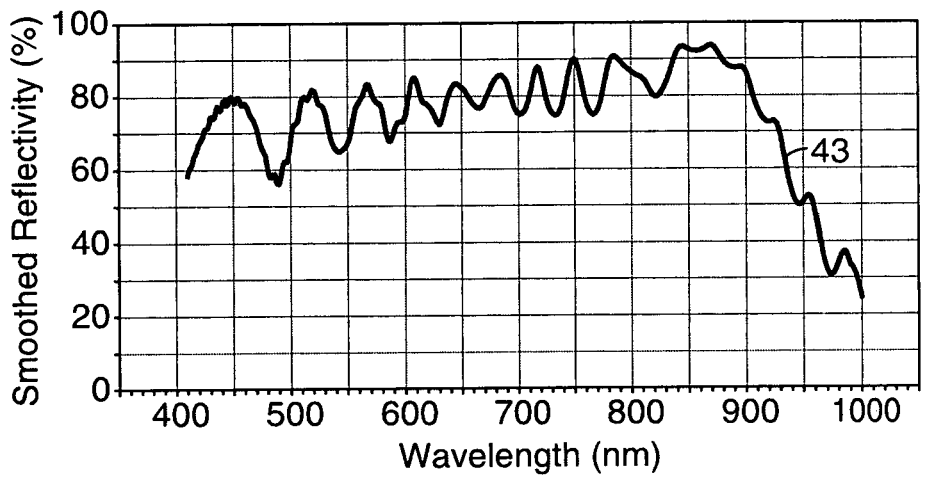
Figure 7C:
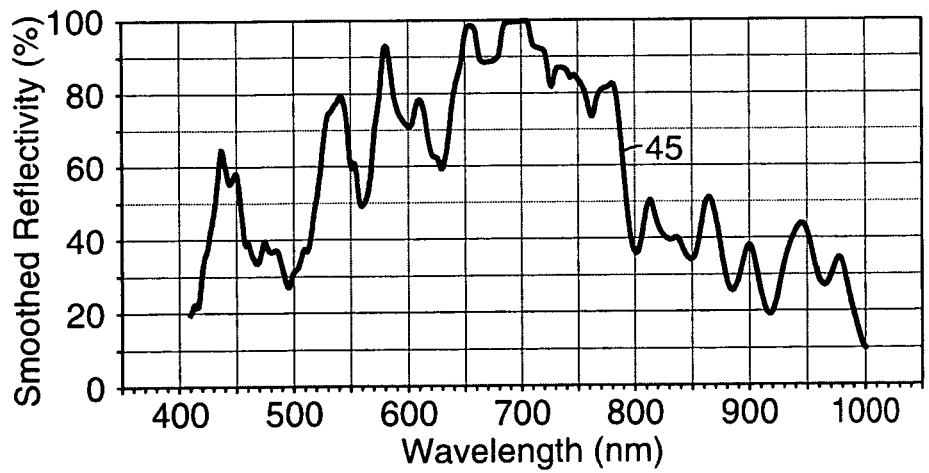

In a first case, X was set to 1 such that the layers were optically thin for each of the three modeled reflectors. The spectral reflectivity was calculated for each layer distribution 40, 42, 44, and a smoothing operation was performed so that the reflectivity reported at any given wavelength $\lambda$ represents an average over a band $\Delta\lambda$=20 nm wide centered on the wavelength $\lambda$. The results are shown in FIGS. 7a-c. Curve 41 is the smoothed reflectivity for the uniform layer distribution 40, curve 43 is the smoothed reflectivity for the graded layer distribution 42, and curve 45 is the smoothed reflectivity for the randomized layer distribution 44. The high maximum reflectivities of well over 50% in the visible for these curves are common for coherent multilayer light reflection, with curves 41 and 45 approaching 100% at selected wavelengths. Note that the uniform and randomized layer distributions produce substantially higher variability in reflectivity over the visible spectrum than the graded layer distribution.

Figure 8A:
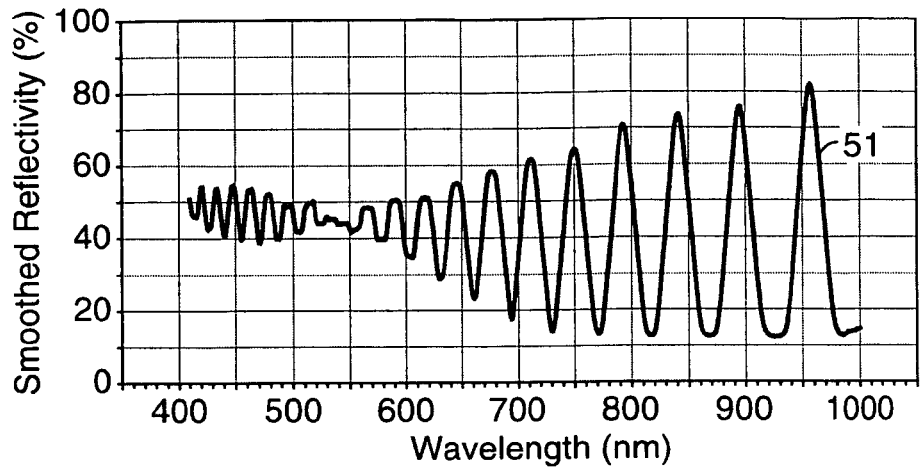
FIGS. 8*a-c* are graphs of modeled reflectivity of normally incident block state light versus wavelength for the thickness profiles of FIG. 6, for a thickness scale factor X=50, where the reflectivity data has again been spectrally smoothed with a 20 nm wide running average.
Figure 8B:
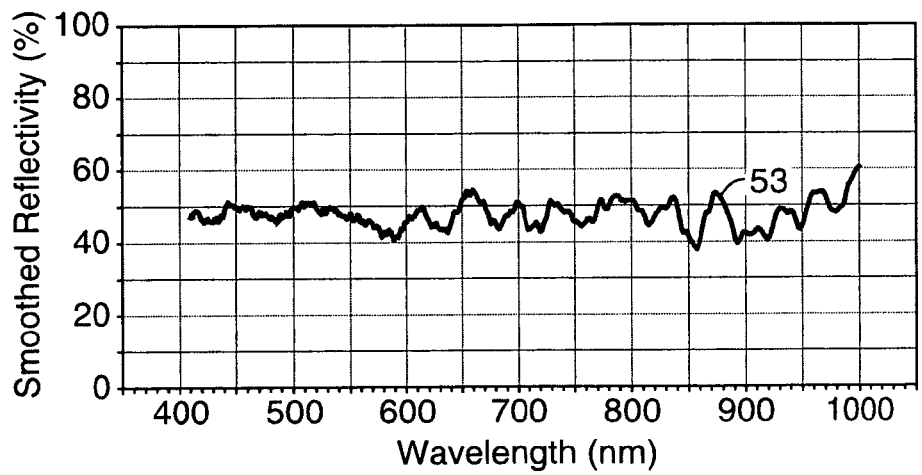
Figure 8C:
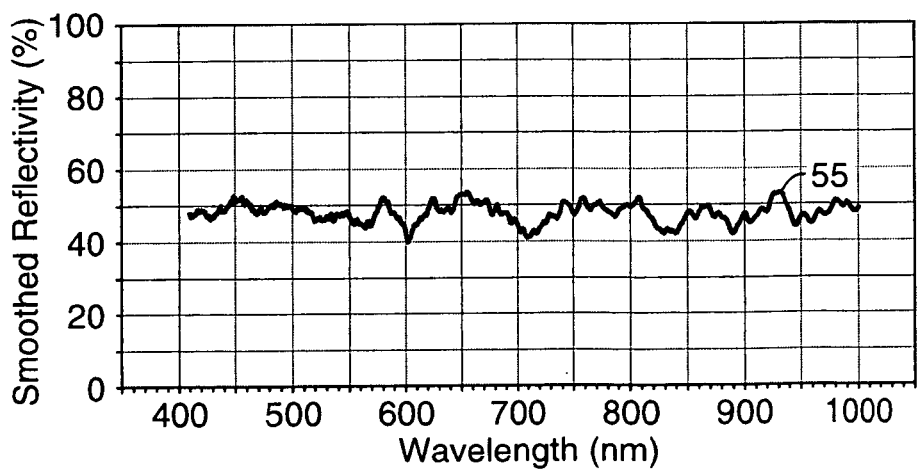

In a second case, the scale factor X was set to 50 to provide optically thick layers, but having the same relative profile as the first case. Smoothed spectral reflectivity was calculated as before, and is shown in FIGS. 8a-c, where curve 51 is for uniform layer distribution 40, curve 53 is for graded layer distribution 42, and curve 55 is for randomized layer distribution 44. Note the maximum reflectivities of the three curves in the visible, generally slightly above 50%, and substantially below that of the curves of FIGS. 7a-c, which is characteristic of incoherent multilayer light reflection. Note also that, even for such optically thick layers, the uniform layer distribution produces significant variability over the visible wavelength range (FIG. 8a). In contrast, the non-uniform layer distributions provide variability of much smaller amplitude (FIGS. 8b, 8c).

Figure 9:
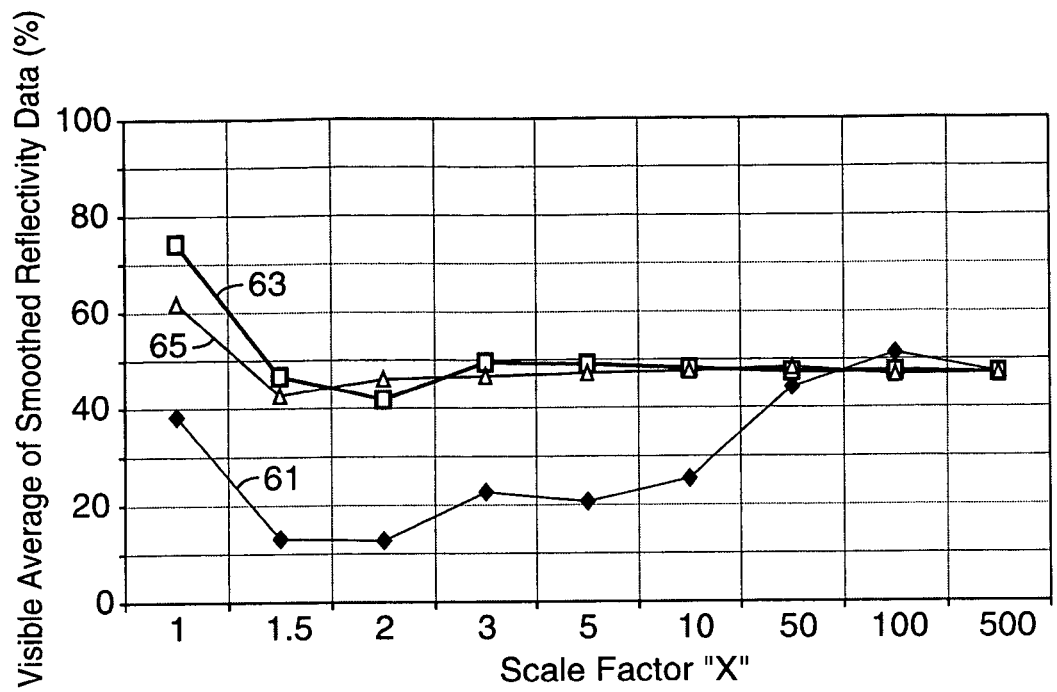
FIG. 9 shows the average of the modeled, smoothed reflectivity over the visible spectrum for selected values of the scale factor X from 1 to 500.
Figure 10:
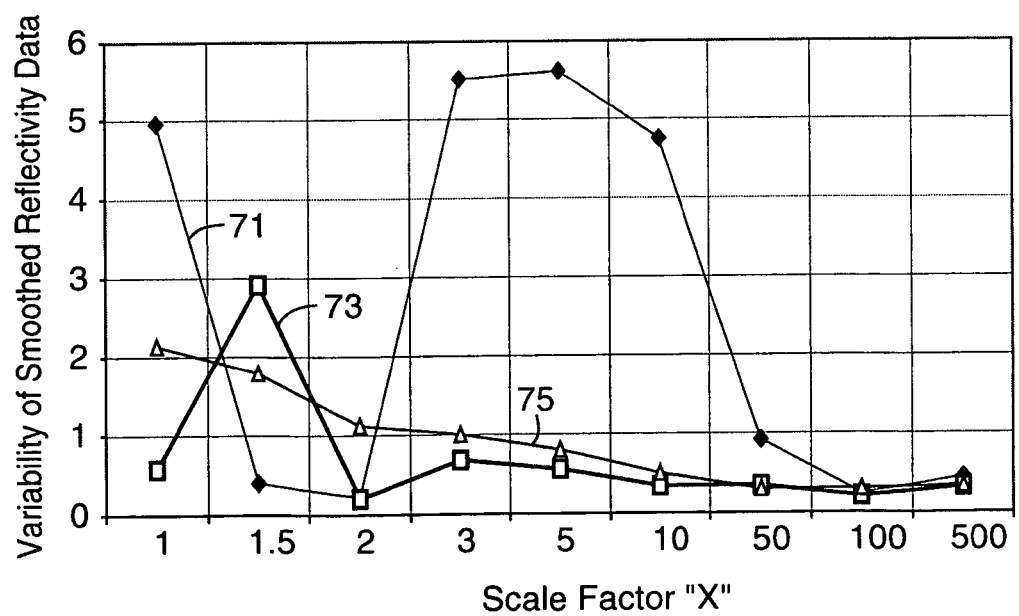
FIG. 10 shows the variability of the modeled, smoothed reflectivity over the visible spectrum for selected values of the scale factor X from 1 to 500.

The above two cases (X=1 and X=50) were then repeated for the additional cases of X=1.5, 2, 3, 5, 10, 100, and 500, and the smoothed spectral reflectivity was calculated as before. For each value of X and for each of the three profiles of FIG. 6, the average $R_{ave}$ and the standard deviation $R_{std}$ of the smoothed reflectivity data was calculated over the visible wavelength range 410-700 nm, i.e., about 400-700 nm. From these numbers a variability parameter, or coefficient of variation ("COV"), was calculated as COV=6*$R_{std}$/$R_{ave}$. The results are shown in FIGS. 9 and 10, which plot $R_{ave}$ and COV respectively for each value of scale factor X. These graphs have a linear vertical axis but a non-linear horizontal axis. Curves 61 and 71 are for the uniform layer distribution 40, curves 63 and 73 are for the graded layer distribution 42, and curves 65 and 75 are for the randomized layer distribution 44. As can be seen by inspection of the figures, the non-uniform layer distributions 42 and 44 can provide substantial benefits relative to the uniform distribution, i.e., generally higher average reflectivity and generally lower spectral variability over the visible spectrum. Of particular note are the following regions: X=3 to 50, X=5 to 50, X=3 to 10, and X=5 to 10. Keeping in mind that for the values of X=3, 5, 10, and 50, the average layer optical thickness for the uniform layer distribution 40 is about 413, 688, 1,375, and 6,875 nm, respectively, and that the average layer optical thickness for each of the non-uniform distributions 42, 44 is about 503, 838, 1,675, and 8,375 nm, respectively, these ranges of interest include average layer optical thickness ranges from about ($\frac{3}{4}$)$\lambda_0$ to 10$\lambda_0$, and from about ($\frac{3}{4}$)$\lambda_0$ to 5$\lambda_0$, for $\lambda_0$ in the visible, for example, for $\lambda_0$ of roughly 550 nm.

From the foregoing, providing a thick film multilayer reflector with a non-uniform optical thickness profile can be seen to provide desirable reflectivity and transmission properties, such as reduced spectral variability for design wavelengths in the visible region, relative to thick film reflectors that have a uniform layer thickness profile. For applications involving human visual response, reduced spectral variability yields a reflector with less perceived color, whether viewed in transmission or reflection.

The foregoing discussion emphasizes the reflectivity and transmission characteristics of a thick film multilayer reflector for normally incident light whose polarization state encounters a sufficiently high refractive index difference $\Delta n$ and a sufficient number of layers N that it is substantially reflected, e.g., on the order of about 50% or at least about 30% or 40% average over the visible region. For a thick film multilayer polarizer, this may correspond to the blocked polarization state. It is also instructive to investigate the reflectivity and transmission characteristics of the pass polarization state of a multilayer polarizer that is intended to have a high average transmission, low average reflectivity, and low spectral variability over the visible spectrum, as well as to investigate off-axis behavior.

For this purpose, the following refractive index properties were adopted for the alternating "A" and "B" layers of the thick film stack:

"A" layers: $n_x$=1.85, $n_y$=1.61, $n_z$=1.51;

"B" layers: $n_x$=1.61, $n_y$=1.61, $n_z$=1.61;

hence, $\Delta n_x$=0.24, $\Delta n_y$=0, $\Delta n_z$=−0.10

These values are representative of a PEN/coPEN polymer system made with a constrained uniaxial stretch, which produces the different y- and z-axis refractive indices in the birefringent "A" layers. It is assumed that the stretch is performed so as to force $\Delta n_y$ to be substantially zero, but the degree of stretch can alternatively be adjusted to provide a suitable balance between the magnitude of $\Delta n_y$ and $\Delta n_z$.

Figure 11:
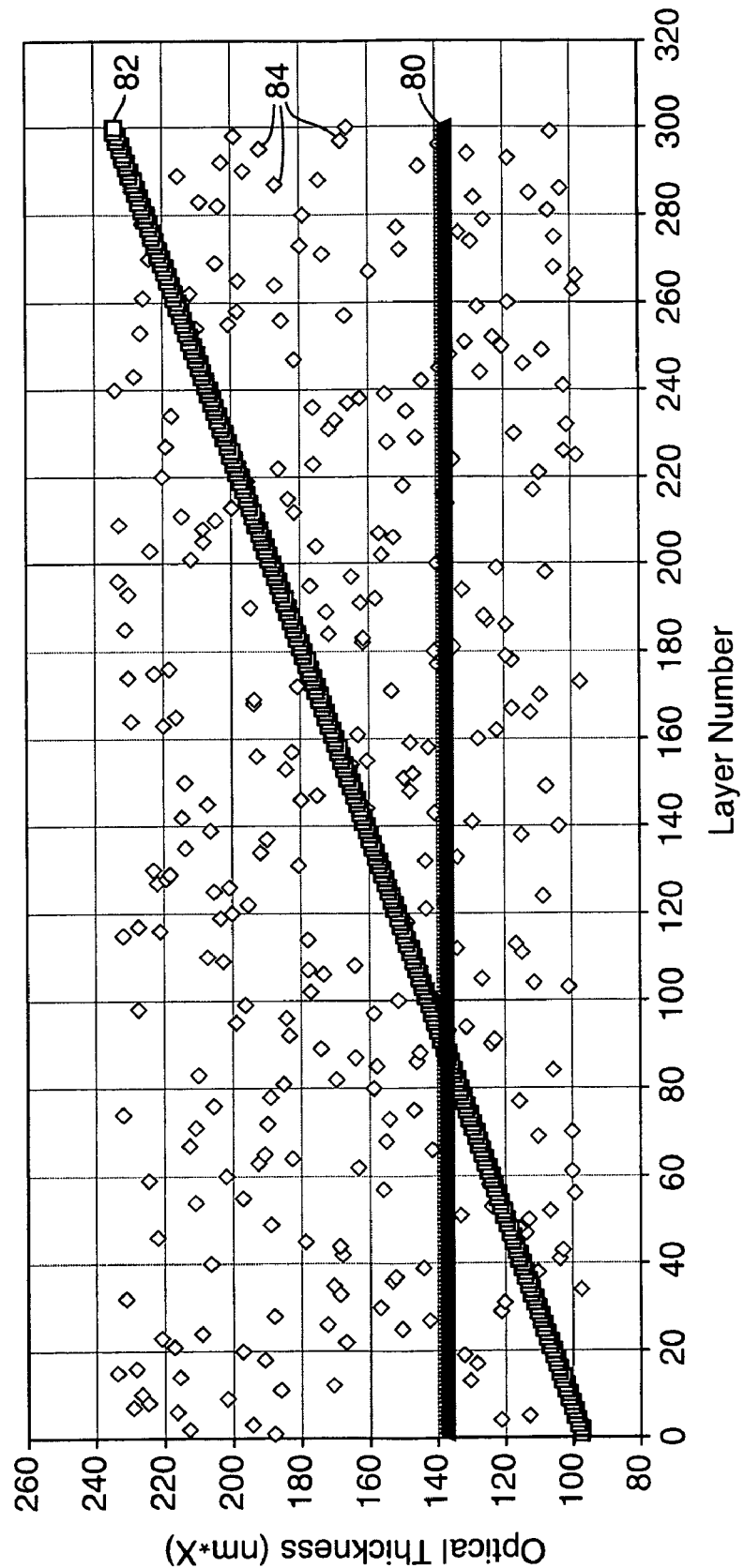
FIG. 11 is a graph of three layer thickness profiles, one uniform, one graded, and one randomized, each such profile consisting of N=300 light-transmissive layers.

Also, the number of total light-transmissive layers was increased from 100 to 300. FIG. 11, which plots optical thickness of each layer versus layer number from one end of the stack to the other, shows the three new thickness distributions modeled, i.e., a uniform distribution 80, a graded distribution 82, and a randomized distribution 84. The distribution 80 has an average (and uniform) layer optical thickness of 137.5 units (≈550/4), while distributions 82 and 84 have slightly higher average optical thicknesses of 165.7 units (≈650/4). As before, each point of the random distribution 84 has a one-to-one correspondence with a point of the graded distribution 82, i.e., the layers in distribution 84 are the very same layers as those of distribution 82 except their order in the stack has been shuffled or mixed to produce the random distribution. Each of the three distributions 80, 82, and 84 maintains an alternating AB repeat pattern throughout the stack. The model again assumed that the stack was immersed in air, and that the layers had no absorption, so that percent transmission plus percent reflection (T+R) equals 100%. As in FIG. 6, the unit of length for optical thickness on the vertical axis of FIG. 11 is shown as having a scale factor "X", to investigate the impact of overall layer thickness or dimension on the effect of randomizing the layer thickness distribution.

Figure 12A:
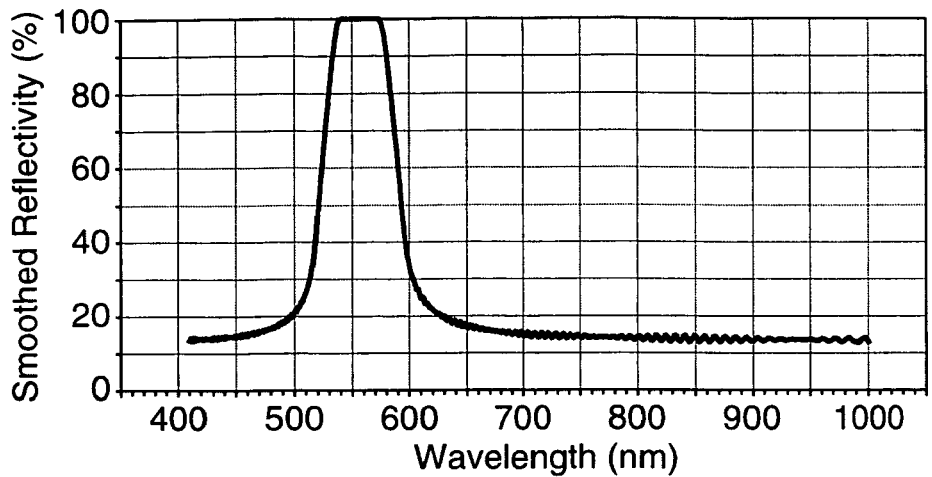
FIGS. 12*a-c* are graphs of modeled reflectivity of normally incident block state light versus wavelength for the thickness profiles of FIG. 11, for a thickness scale factor X=1, where the reflectivity data has been spectrally smoothed with a 20 nm wide running average.
Figure 12B:
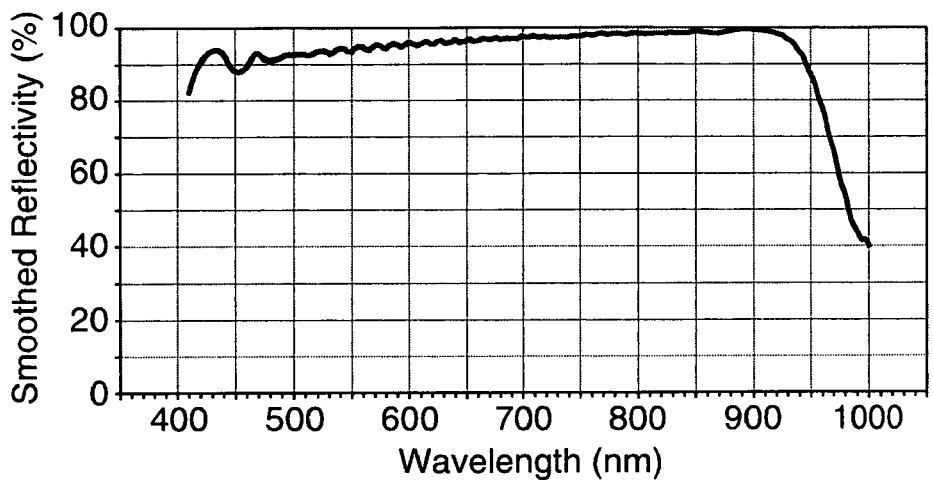
Figure 12C:
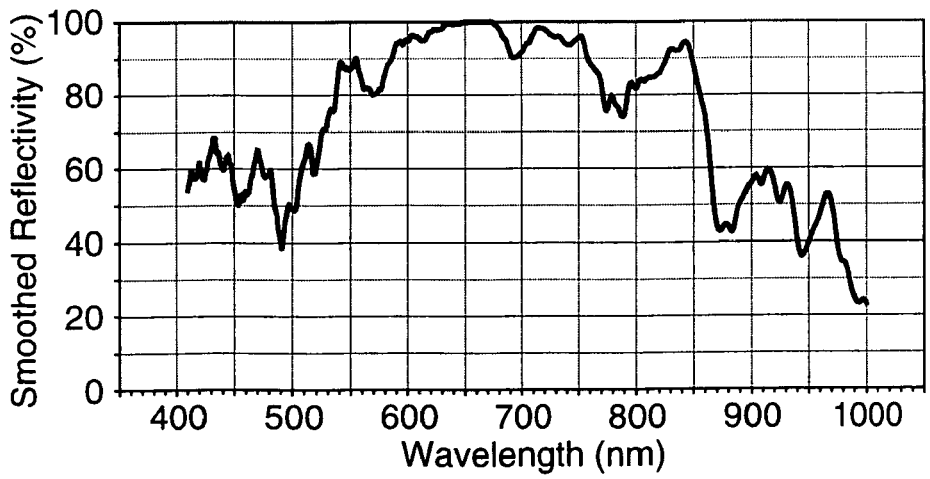
Figure 13A:
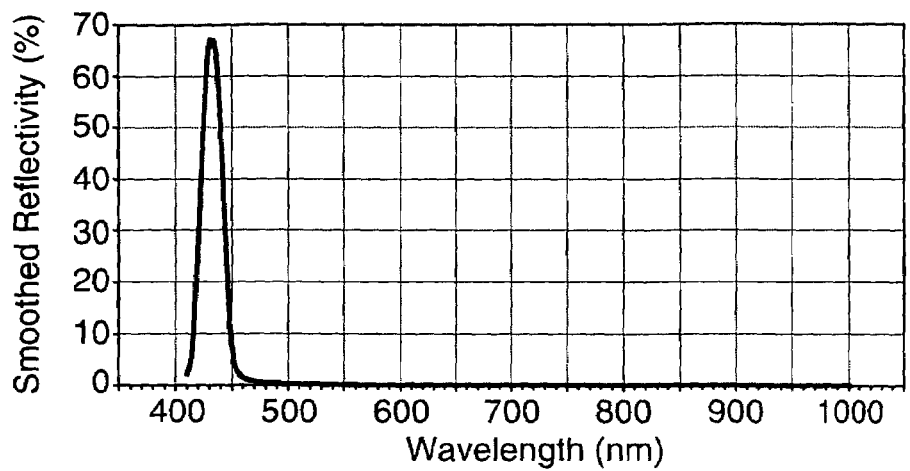
FIGS. 13*a-c* are graphs of modeled reflectivity of obliquely incident p-polarized pass state light versus wavelength for the thickness profiles of FIG. 11, for a thickness scale factor X=1, where the reflectivity data has again been spectrally smoothed with a 20 nm wide running average.
Figure 13B:
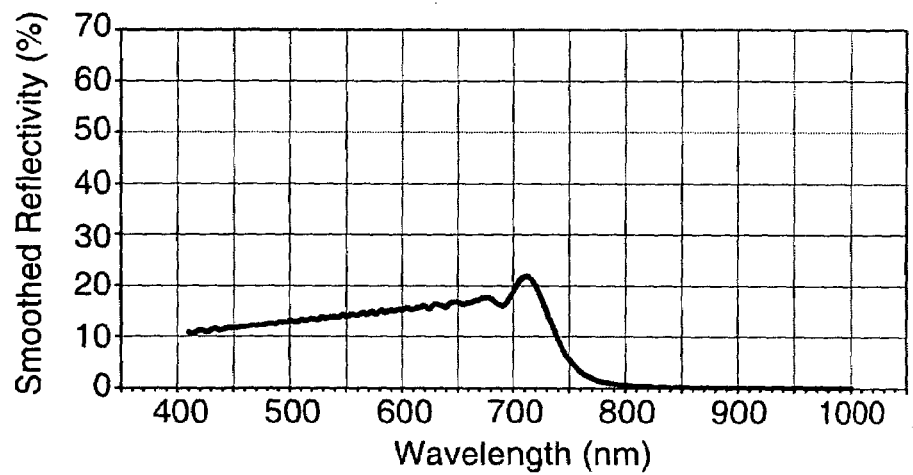
Figure 13C:
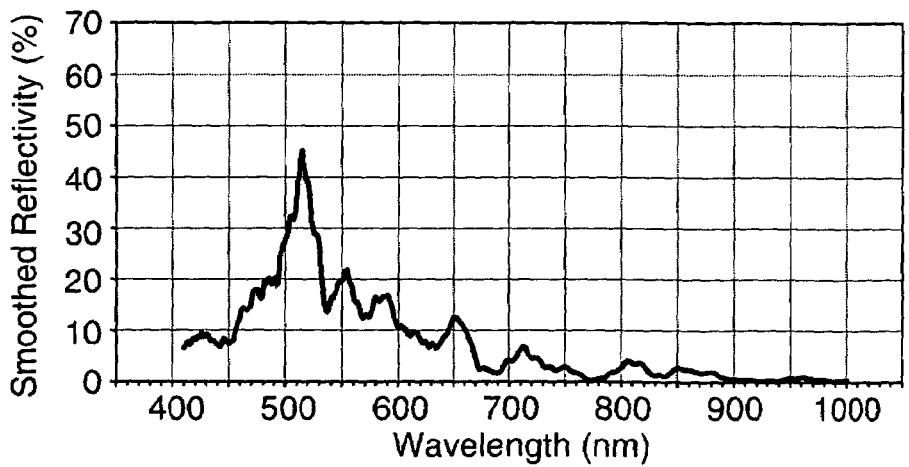

In a first case relating to this constrained polarizer, X was set to 1 so that the layers were optically thin for each of the three modeled reflectors. The spectral reflectivity was calculated for each layer distribution 80, 82, 84, and a smoothing operation was performed so that the reflectivity reported at any given wavelength $\lambda$ represents an average over a band $\Delta\lambda$=20 nm wide centered on the wavelength $\lambda$. These reflectivity calculations were done for two types of incident light: (1) normal incidence, block polarization state; and (2) oblique incidence ($\theta$=60°, see FIG. 3) pass polarization state. The normally incident light was thus incident parallel to the z-axis and polarized parallel to the x-axis, while the obliquely incident light was incident in the y-z plane and p-polarized in this plane of incidence. Thus, both the blocking properties and the pass properties of this constrained thin film multilayer polarizer were investigated. The results for the block state normally incident light are shown in FIGS. 12*a-c*, which show the behavior of uniform, graded, and randomized layer distributions (80, 82, 84) respectively. The results for the obliquely incident p-polarized light are shown in FIGS. 13*a-c*, which show the behavior of uniform, graded, and randomized layer distributions (80, 82, 84) respectively.

Figure 14A:
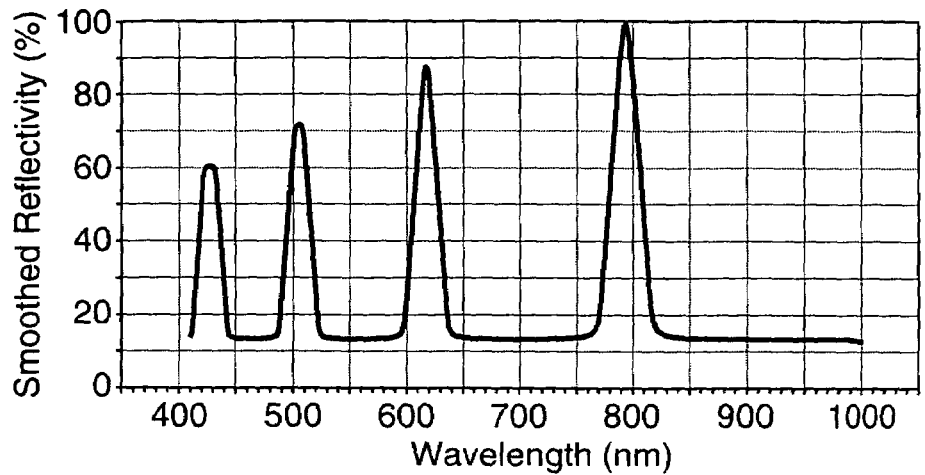
FIGS. 14*a-c* correspond to FIGS. 12*a-c* respectively, except for a thickness scale factor X=10.
Figure 14B:
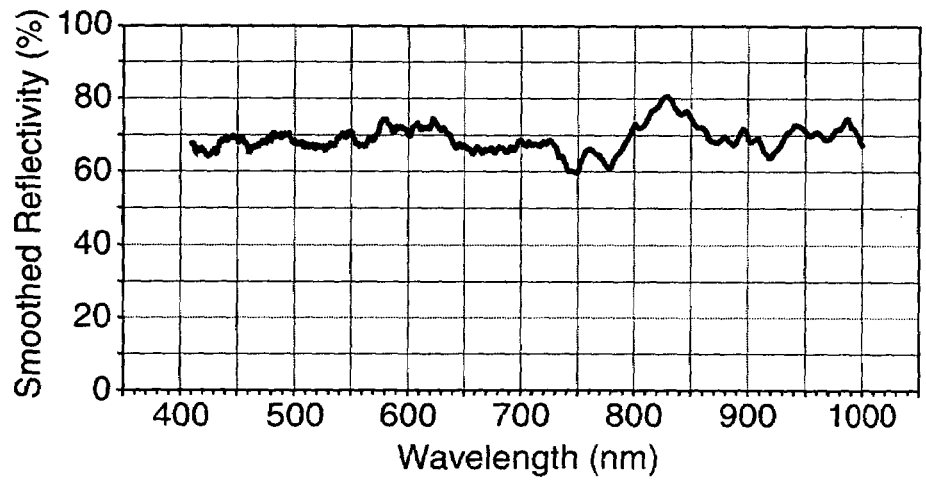
Figure 14C:
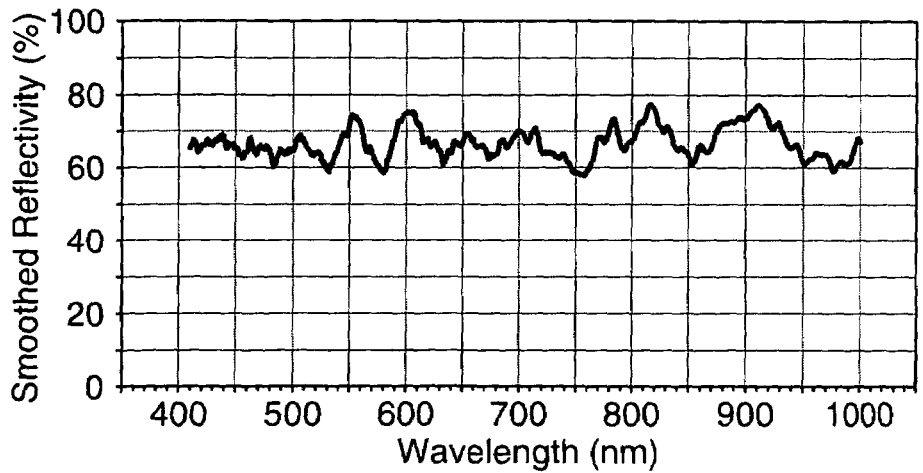
Figure 15A:
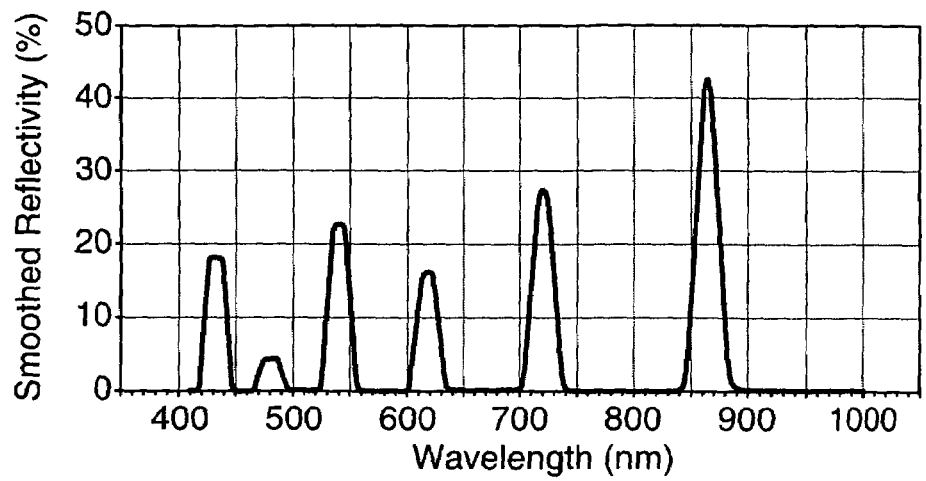
FIGS. 15*a-c* correspond to FIGS. 13*a-c* respectively, except for a thickness scale factor X=10.
Figure 15B:
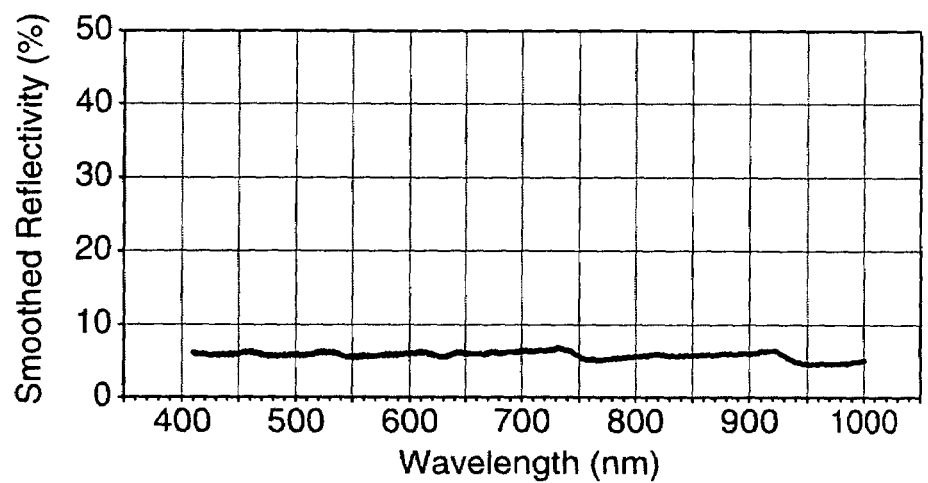
Figure 15C:
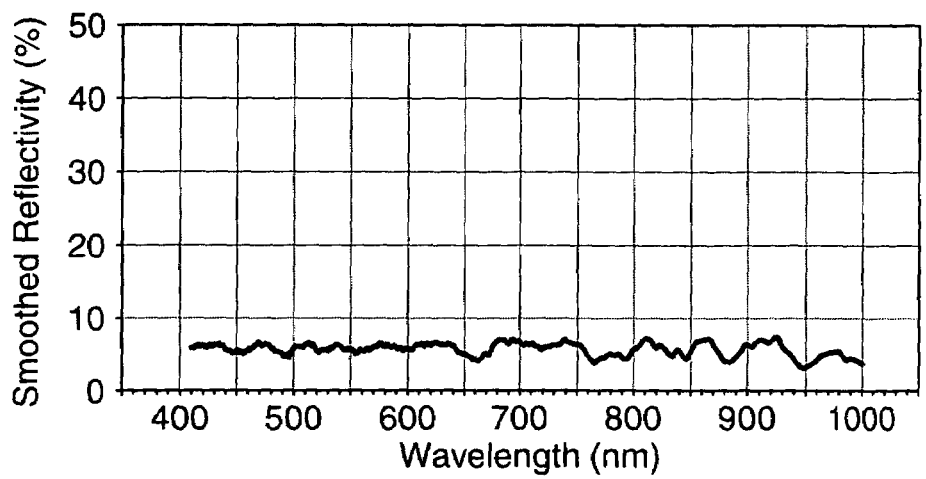

In a second case relating to this constrained polarizer, X was set to 10 so that the layers were optically thick for each of the three modeled reflectors. The spectral reflectivity was calculated for each layer distribution 80, 82, 84, and a smoothing operation was performed as described above with $\Delta\lambda$=20 nm. The reflectivity calculations were again done for: (1) normal incidence, block polarization state light (incident parallel to the z-axis and polarized parallel to the x-axis); and (2) $\theta$=60° oblique incidence pass polarization state light (incident in the y-z plane and p-polarized in this plane). The results for the block state normally incident light are shown in FIGS. 14*a-c*, which show the behavior of uniform, graded, and randomized layer distributions (80, 82, 84) respectively. The results for the obliquely incident p-polarized light are shown in FIGS. 15*a-c*, which show the behavior of uniform, graded, and randomized layer distributions (80, 82, 84) respectively.

Figure 16:
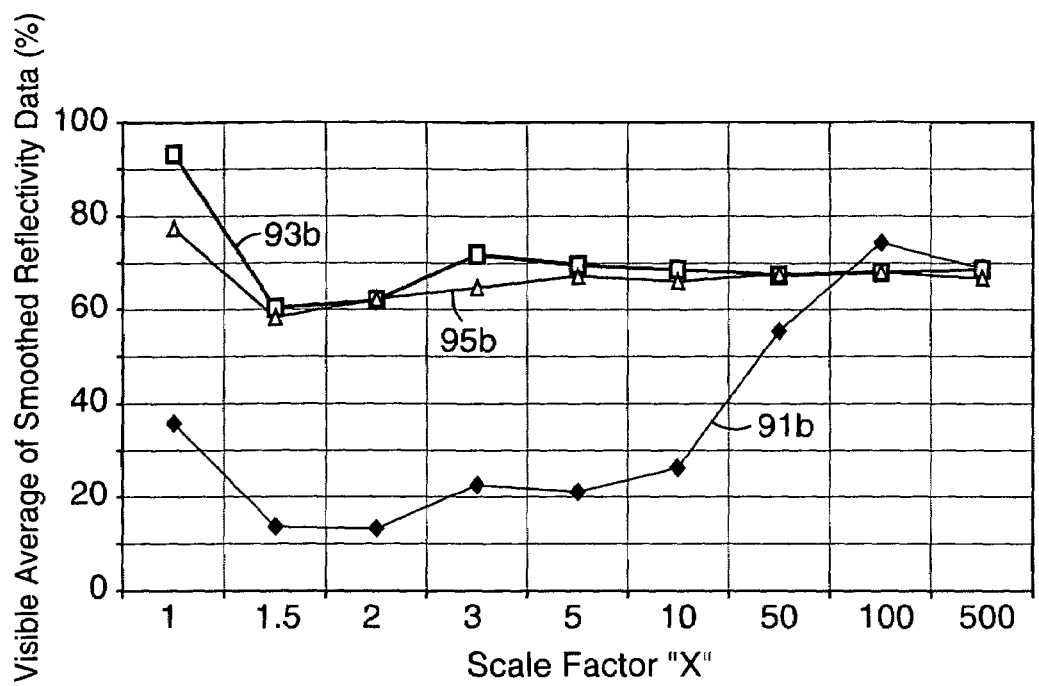
FIG. 16 shows the average of the modeled, smoothed reflectivity of normally incident block state light over the visible spectrum for selected values of the scale factor X from 1 to 500.
Figure 17:
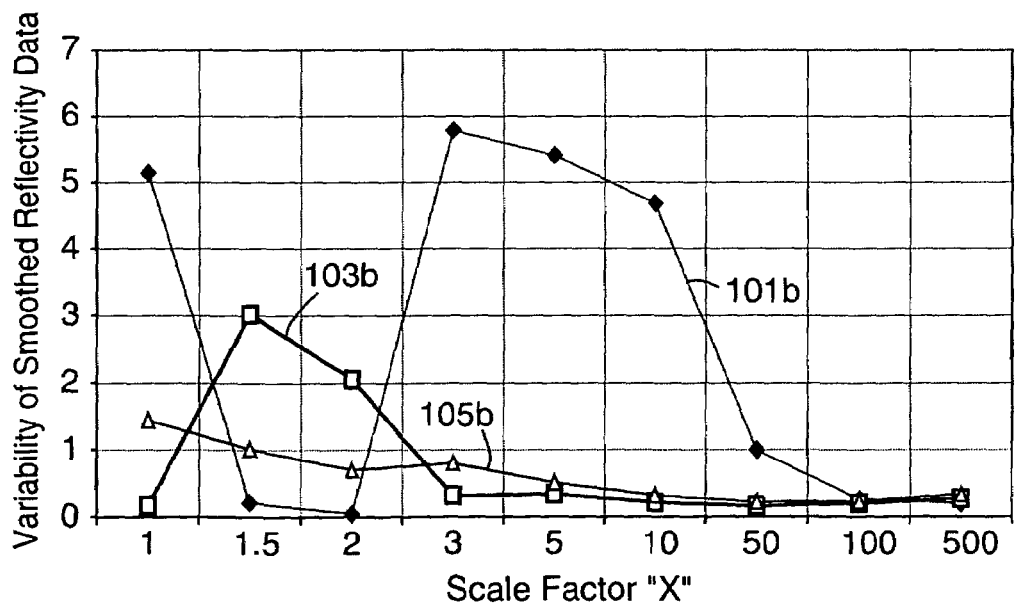
FIG. 17 shows the variability of the modeled, smoothed reflectivity of normally incident block state light over the visible spectrum for selected values of the scale factor X from 1 to 500.
Figure 18:
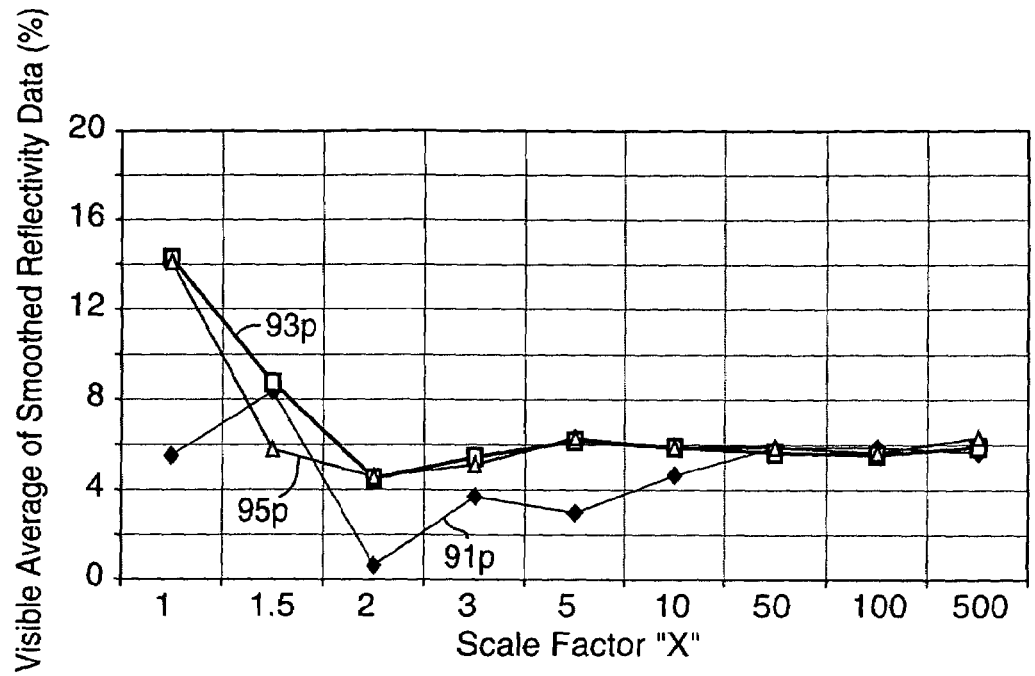
FIGS. 18 and 19 correspond to FIGS. 16 and 17 respectively, except for obliquely incident p-polarized pass state light.
Figure 19:
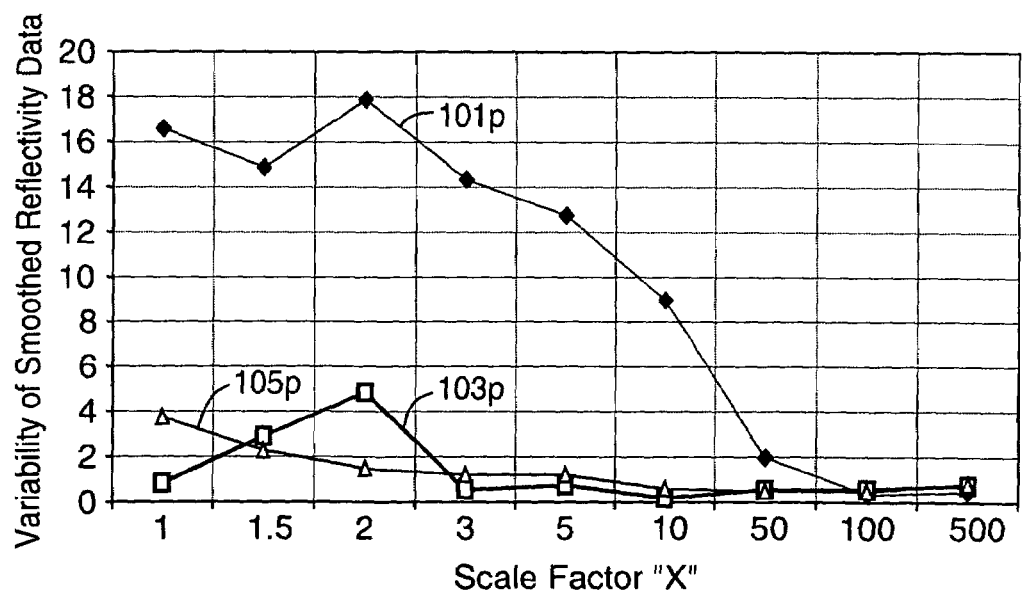

The above two cases (X=1 and X=10) relating to the constrained polarizer were then repeated for the additional cases of X=1.5, 2, 3, 5, 50, 100, and 500, and the smoothed spectral reflectivity was calculated as before for both the normally incident block state light and the 60 degree incident p-polarized light. For each value of X, each type of incident light modeled, and each of the three profiles of FIG. 11, the average $R_{ave}$ and the standard deviation $R_{std}$ of the smoothed reflectivity data was calculated over the visible wavelength range 410-700 nm (about 400-700 nm), and from these numbers the coefficient of variation (COV 6*$R_{std}$/$R_{ave}$) was calculated. The results for the normally incident block state light are shown in FIGS. 16 and 17, which plot $R_{ave}$ and COV respectively for each value of scale factor X. These graphs have a linear vertical axis but a non-linear horizontal axis. Curves 91*b* and 101*b* are for the uniform thickness profile 80, curves 93*b* and 103*b* are for the graded thickness profile 82, and curves 95*b* and 105*b* are for the randomized thickness profile 84. The results for the obliquely incident p-polarized pass state light are shown in FIGS. 18 and 19, which plot $R_{ave}$ and COV respectively for each value of scale factor X. These graphs likewise have a linear vertical axis but a non-linear horizontal axis. Curves 91$p$ and 101$p$ are for the uniform thickness profile 80, curves 93$p$ and 103$p$ are for the graded thickness profile 82, and curves 95$p$ and 105$p$ are for the randomized thickness profile 84.

Inspection of FIGS. 12*a-c*, 14*a-c*, 16, and 17 confirm again that for normally incident light in the block polarization state, a non-uniform layer thickness distribution can be used advantageously in thick film multilayer reflectors. The non-uniform distributions can provide substantial benefits relative to the uniform distribution, i.e., generally higher average reflectivity and generally lower spectral variability over the visible spectrum, for certain values of average layer thickness in the stack that include the ranges from about $(5/4)\lambda_0$ to $10\lambda_0$, and about $(5/4)\lambda_0$ to $5\lambda_0$, for $\lambda_0$ in the visible (e.g. about 550 nm).

Inspection of FIGS. 13*a-c*, 15*a-c*, 18, and 19 show that these conclusions—particularly the one pertaining to reduced variability—also substantially apply to obliquely incident p-polarized pass state light in a thick film multilayer polarizer having a residual z-axis refractive index mismatch between layers. This is light that would, for small angles of incidence θ, have little or no reflectivity over the visible because of the negligible y-axis refractive index mismatch. However, as the angle of incidence θ increases, a small but growing amount of this light is reflected due to the growing z-axis component of the electric field. If this reflectivity varies substantially over the visible wavelength range, an observer viewing the transmitted light will begin to see undesirable color. For example, if the thick film reflective polarizer is used in a light recycling cavity of a backlight for a liquid crystal display, an observer viewing the display from an oblique angle will begin to see a color change relative to viewing the display at a normal angle, if reflectivity of the thick film polarizer for pass state p-polarized light is non-negligible and substantially variable.

An analysis of the expected brightness increase or "gain" of a backlight or display incorporating the above-described thick film reflective polarizers can also be done, as can an analysis of the expected color change imposed on the viewed light due to variability in transmission and reflection of the polarizer. The color change is modeled relative to a CCFL light source, typical in liquid crystal display backlights. The layer distributions, refractive indices, and other features of the constrained stretch multilayer polarizers described in connection with FIGS. 11-19 were assumed. The results are given in Tables 1, 2, and 3:

TABLE 1

Normal axis (θ = 0°) luminous gain

| | Scale Factor X = 1 (Thin Film Multilayer) | Scale Factor X = 10 (Thick Film Mulitlayer) |
|---|---|---|
| Uniform layer distribution (curve 80) | 1.270 1.403 | 1.068 1.022 |
| Gradient layer distribution (curve 82) | 1.594 1.524 | 1.361 1.435 |
| Randomized layer distribution (curve 84) | 1.527 1.410 | 1.355 1.421 |

In Table 1, each cell contains two numbers. The upper number is the luminous gain at normal viewing angle, the lower number is the luminous gain for an oblique viewing angle, 60° from normal.

TABLE 2

Normal axis (θ = 0°) color change

| | Scale Factor X = 1 (Thin Film Multilayer) | Scale Factor X = 10 (Thick Film Mulitlayer) |
|---|---|---|
| Uniform layer distribution (curve 80) | −0.001 0.031 | 0.006 −0.001 |
| Gradient layer distribution (curve 82) | 0.002 0.002 | 0.001 0.000 |
| Randomized layer distribution (curve 84) | 0.020 0.019 | 0.001 0.001 |

In Table 2, each cell also contains two numbers. The upper number is the change in the chromaticity color coordinate "x"; the lower number is the change in the chromaticity color coordinate "y", for observation of the display from a normal-view angle. These changes in chromaticity coordinates x and y are with respect to the chromaticity color coordinates x and y of the CCFL source used in the calculations to represent the backlight source. In display applications, it is considered desirable to limit the change in each of these chromaticity color coordinates to a maximum of ±0.01.

TABLE 3

Oblique angle (θ = 60°) color change

| | Scale Factor X = 1 (Thin Film Multilayer) | Scale Factor X = 10 (Thick Film Mulitlayer) |
|---|---|---|
| Uniform layer distribution (curve 80) | 0.018 0.071 | 0.007 −0.013 |
| Gradient layer distribution (curve 82) | −0.001 −0.001 | 0.001 0.001 |
| Randomized layer distribution (curve 84) | 0.020 0.005 | 0.001 0.002 |

As in Table 2, the upper number in each cell of Table 3 is the change in chromaticity color coordinate "x"; the lower number in each cell of Table 3 is the change in chromaticity color coordinate "y" for observation of the display from an oblique-view angle of 60° from normal. Again, it is considered desirable in the display industry to limit the change in each of these color coordinates to a maximum of ±0.01.

From the three tables it can be seen that a thick film multilayer reflective polarizer having a non-uniform layer optical thickness distribution can provide significant amounts of luminous gain and acceptably small amounts of color change in light recycling cavity display/backlight applications.

Further discussion of thick film reflective polarizers in displays can be found in commonly assigned and copending U.S. Application entitled "Multifunctional Thick Film Reflective Polarizer For Displays", Attorney Docket No. 60747US002, filed on even date herewith.

Discussion

The ability to achieve desired relationships among the various indices of refraction (and thus the optical properties of the multilayer reflector device) is influenced by the processing conditions used to prepare the multilayer device. In the case of organic polymers that can be oriented by stretching, the devices can be generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is generally stretched substantially in one direction (uniaxial orientation, whether constrained or unconstrained), while in the case of mirrors the film is generally stretched substantially in two directions (biaxial orientation). See, for example, U.S. Pat. No. 5,882,774 (Jonza et al.), U.S. Pat. No. 6,827,886 (Neavin et al.), and U.S. Patent Application Publication 2004/0099992 A1 (Merrill et al.). In either case, the stretching can be done on a continuous manufacturing line, e.g. with a combination of length orienters and width orienters (tenters), or on an individual sheet-by-sheet basis using a batch uniaxial or biaxial stretcher.

The z-axis refractive index relationships discussed in '774 Jonza et al. can of course be used beneficially with the embodiments disclosed herein. Thus, the refractive indices of the constituent layers can be selected so that they produce interfaces for which the Brewster angle (the angle at which reflectance of p-polarized light goes to zero) is very large or is nonexistent by substantially matching the refractive indices in the thickness direction of adjacent layers. This allows for the construction of multilayer mirrors and polarizers whose reflectivity for p-polarized light decreases slowly with angle of incidence, are independent of angle of incidence, or increase with angle of incidence away from the normal. As a result, multilayer films having high reflectivity (for both s and p polarized light for any incident direction in the case of mirrors, and for the selected direction in the case of polarizers) over a wide bandwidth, can be achieved. For example, the refractive index difference of adjacent layers along the thickness or z-axis $\Delta n_z$ can be made zero or substantially zero, or small relative to an in-plane refractive index difference $\Delta n_x$, such as less than 0.5, 0.25, 0.1, or 0.05 times $\Delta n_x$. Furthermore, whether large or small, $\Delta n_z$ can be made to have an opposite polarity relative to an in-plane refractive index difference $\Delta n_x$.

For embodiments in which the thick film multilayer reflector is or comprises an oriented stack of polymer layers, the pre-stretch temperature, stretch temperature, stretch rate, stretch ratio, heat set temperature, heat set time, heat set relaxation, and cross-stretch relaxation can be selected to yield a multilayer device having suitable refractive index relationships. These variables are inter-dependent; thus, for example, a relatively low stretch rate may be used if coupled with, e.g., a relatively low stretch temperature. It will be apparent to one of ordinary skill how to select the appropriate combination of these variables to achieve the desired multilayer device.

Lamination of two or more sheets together in the manufacture of the disclosed thick film multilayer reflectors can be advantageous, such as to improve reflectivity or to form a mirror from two polarizers. In some cases, the number N of thick layers used in the reflector, and the average layer thickness and the layer material properties, may be such as to make the finished reflector rigid or stiff, and thus difficult to manufacture using only a single stretching operation. This is because the precursor or starting multilayer product which, after stretching, yields the finished thick film multilayer reflector, must have an overall thickness even greater than that of the finished reflector due to the consequence of thinning during stretching. In cases such as this, it may be advantageous to extrude and stretch single- or multiple layer polymer webs for example in a continuous roll process, and then employ a lamination process whether with multiple rolls continuously or with multiple individual sheets in a batch format. Lamination can be assisted with bonding means such as adhesive layers or tie layers between webs or sheets. In this way, single- or multiple layer polymer webs can be fabricated with conventional length orienters and/or tenters, and then be combined into a physically thick product such as a rigid plate that could not itself have been oriented on such equipment.

As mentioned above, uniaxial orientation of the multilayer construction can be done in a constrained or unconstrained fashion. For physically thick films, an unconstrained stretch can be advantageous in that the precursor or starting multilayer product need not be so thick as it would need to be if a constrained stretch were used. That is because the relaxation in the cross-stretch direction minimizes the amount of thinning that occurs for a given stretch ratio. The multilayer constructions can be stretched in the machine direction, as with a length orienter, or in the transverse (width) direction using a tenter. The multilayer constructions can be oriented simultaneously along two orthogonal directions, or sequentially, or both simultaneously and sequentially.

Figure 20:
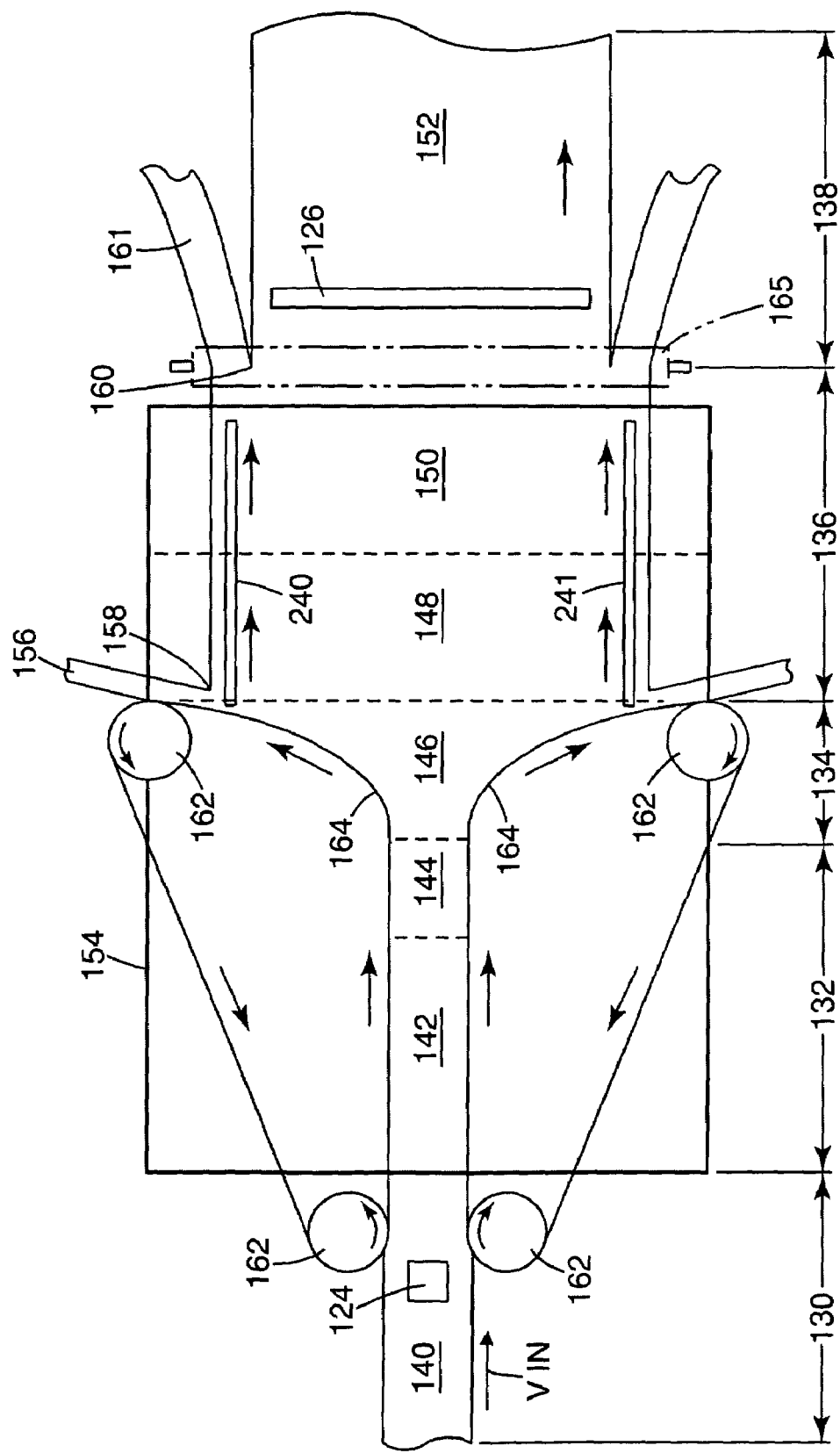
FIG. 20 is a schematic illustration of a uniaxial stretching apparatus and process.

FIG. 20 shows one embodiment of a stretching apparatus and method, which stretches a region of an optical body from an initial configuration 124 to a final, finished configuration 126. The optical body, which can be any thick film, thin film, or hybrid multilayer reflector or precursor thereof described herein (including a single layer film), can be provided to the stretching apparatus by any desirable method. In exemplary embodiments, the optical body can be stretched in a uniaxial manner that is precisely unconstrained, substantially unconstrained, or nearly unconstrained. Generally, an optical body 140 is presented in region 130 to one or more gripping members that are configured and arranged to hold opposing edges of the optical body and convey the optical body along opposing tracks 164 defining predetermined paths. The gripping members (not shown) typically hold the optical body at or near its edges. The portions of the optical body held by the gripping members are often unsuitable for use after stretching so the position of the gripping members is typically selected to provide sufficient grip on the film to permit stretching while controlling the amount of waste material generated by the process. The gripping members, such as clips, can be directed along the track by, for example, rollers 162 rotating a chain along the track with the gripping members coupled to the chain. The rollers are connected to a driver mechanism that controls the speed and direction of the film as it is conveyed through the stretching apparatus. Rollers can also be used to rotate and control the speed of belt-type gripping members.

In some embodiments, the optical body can be drawn in plane (i.e., the boundary trajectories and tracks are coplanar), but non-coplanar stretching trajectories can also be used. An ideal unconstrained uniaxial orientation or stretch can be achieved by configuring opposing tracks 164 to define a pair of mirror symmetric, coplanar, parabolic trajectories diverging away from the in-plane MD centerline.

The apparatus optionally includes a preconditioning region 132 that typically is enclosed by an oven 154 or other apparatus or arrangement to heat the optical body in preparation for stretching. The preconditioning region can include a preheating zone 142, a heat soak zone 144, or both. The optical body can be stretched in a primary stretching region 134. Typically, within the primary stretching region 134 the optical body is heated or maintained in a heated environment above the glass transition of the polymer(s) of the optical body. Within the primary stretching region 134, the gripping members follow generally diverging tracks to stretch the optical body by a desired amount. The tracks in the primary stretching region and in other regions of the apparatus can be formed using a variety of structures and materials. Outside of the primary stretching region, the tracks are typically substantially linear. The opposing linear tracks can be parallel or can be arranged to be converging or diverging. Within the primary stretching region, the tracks are generally diverging. In all regions of the stretching apparatus, the tracks can be formed using a series of linear or curvilinear segments that are optionally coupled together. As an alternative or in particular regions or groups of regions, the tracks can be formed as a single continuous construction. In at least some embodiments, the tracks in the primary stretching region are coupled to, but separable from, the tracks of the preceding regions. The tracks 240, 241 in the succeeding post-conditioning or removal regions are typically separated from the tracks of the primary stretching region, as illustrated. In some embodiments, the positions of one or more, and preferably all, of the track segments are adjustable (e.g., pivotable about an axis) so that the overall shape of the tracks can be adjusted if desired. Continuous tracks can also be used through each of the regions.

Typically, the portions of the optical body that were held by the gripping members through the primary stretching region are removed.

To maintain a substantially uniaxial draw throughout substantially all of the draw history (as shown in the figure), at the end of the transverse stretch, the rapidly diverging edge portions 156 are preferably severed from the stretched optical body 148 at a slitting point 158. A cut can be made at 158 and flash or unusable portions 156 can be discarded. Release of the selvages from a continuous gripping mechanism can be done continuously; however, release from discrete gripping mechanisms, such as tenter clips, should preferably be done so that all the material under any given clip is released at once. This discrete release mechanism may cause larger upsets in stress that may be felt by the drawing web upstream. In order to assist the action of the isolating takeaway device, a continuous selvage separation mechanism can be used in the device, e.g. the "hot" slitting of the selvage from the central portion of a heated, drawn film. The slitting location can be located near enough to the "gripline", e.g. the isolating takeaway point of first effective contact by the gripping members of the take-away system, to minimize or reduce stress upsets upstream of that point. If the film is slit before the film is gripped by the take-away system, instable takeaway can result, for example, by film "snapback" along TD. The film is thus preferably slit at or downstream of the gripline. Slitting is a fracture process and, as such, typically has a small but natural variation in spatial location. Thus it may be desirable to slit slightly downstream of the gripline to prevent any temporal variations in slitting from occurring upstream of the gripline. If the film is slit substantially downstream from the gripline, the film between the takeaway and boundary trajectory will continue to stretch along TD. Since only this portion of the film is now drawing, it now draws at an amplified draw ratio relative to the boundary trajectory, creating further stress upsets that could propagate upstream, for example, undesirable levels of machine direction tension propagating upstream.

The slitting is preferably mobile and re-positionable so that it can vary with the changes in takeaway positions needed to accommodate variable final transverse draw direction ratio or adjustment of the position of the take-away system. An advantage of this type of slitting system is that the draw ratio can be adjusted while maintaining the draw profile simply by moving the take-away slitting point 158, preferably along the MD. A variety of slitting techniques can be used including a heat razor, a hot wire, a laser, a focused beam of intense IR radiation or a focused jet of heated air.

The apparatus may optionally include a post-conditioning region 136. For example, the optical body may be set (e.g., heat set) in zone 148 and quenched in zone 150. A takeaway system may be used to remove the optical body from the primary stretching region 134. In the illustrated embodiment, this takeaway system is independent of (i.e., isolated from or not directly connected to) the tracks upon which the film was conveyed through the primary stretching region. The takeaway system can use any film conveyance structures such as tracks 240, 241 with gripping members such as, for example, opposing sets of belts or tenter clips.

In some embodiments, TD shrinkage control can be accomplished using tracks 240, 241 that are angled with respect to each other. For example, the tracks of the takeaway system can be positioned to follow a slowly converging path (making an angle of no more than about 5°) through at least a portion of the post conditioning region to allow for TD shrinkage of the film with cooling. In other embodiments, the two opposing tracks can be diverging typically at an angle of no more than about 3° although wider angles can be used in some embodiments. This can be useful to increase the MD tension of the film in the primary stretching region to, for example, reduce property non-uniformity such as the variation of principal axes of refractive index across the film.

In some embodiments, the centerline of the take-away system can be angled with respect to the centerline of the film as the film is conveyed through the tracks 164 of the primary stretching region. An angled take-away system, primary stretching zone, or both can be useful to provide films where the principal axis or axes of an property of the film, such as the refractive index axes or tear axis, is angled with respect to the film. In some embodiments, the angle that the take-away system makes with respect to the primary stretching zone is adjustable manually or mechanically using a computer-controlled driver or other control mechanism or both.

The process can also include a removal portion in region 138. Optionally a roller 165 may be used to advance the stretched film 152, but this component may be omitted if desired. Another cut 160 may be made and unused portion 161 may be discarded. Film leaving the take-away system is typically wound on rolls for later use. Alternatively, direct converting may take place after take away. Further details of the device and method can be found in U.S. Application Publication Nos. 2002/0190406 (Merrill et al.), 2002/0180107 (Jackson et al.), 2004/0099992 (Merrill et al.) and 2004/0099993 (Jackson et al.).

With the above-described design considerations established, one of ordinary skill will readily appreciate that a wide variety of materials can be used to form the disclosed thick film multilayer reflectors when processed under conditions selected to yield the desired layer thickness profile and refractive index relationships.

For embodiments comprising coextruded polymers, it is known to divide the flow of two molten polymer streams into an alternating AB pattern using a feeder tube plate having a plurality of interleaved side channel tubes or conduits that each feed its own respective slot die. See, e.g., U.S. Pat. No. 6,827,886 (Neavin et al.). A gradient plate having two flow channels, one to feed a first polymer to half the conduits, the other to feed the other polymer to the remaining conduits, can be coupled to the feeder tube plate if desired. A desired layer thickness distribution, such as a randomized layer distribution, can be achieved, for example, by separately configuring the individual conduits in the feeder tube plate by, e.g., adjusting their diameter, length, and/or a local temperature. By so configuring the conduits, a greater or lesser amount of a particular polymer, as desired, can be fed into any particular conduit corresponding to any particular layer(s) of the finished multilayer reflector, thereby to make such layer(s) thicker or thinner.

The desired refractive index relationships can be achieved in a variety of ways, including stretching during or after film formation (e.g., in the case of organic polymers), extruding (e.g., in the case of liquid crystalline materials), or coating. In some cases it is desirable for the two materials to have similar rheological properties (e.g., melt viscosities) such that they can be co-extruded. Appropriate material combinations may comprise, as a first light-transmissive material, a crystalline or semi-crystalline material, preferably a polymer. A second light-transmissive material, in turn, may be crystalline, semi-crystalline, or amorphous. The second material may have a birefringence opposite to or the same as that of the first material. Or, the second material may have no birefringence. Indeed in some mirror constructions both the first and the second material may have no birefringence.

In cases where a first material is used that is optically birefringent and a second material is used that is optically isotropic, it may be desirable to adjust the distribution of layer thicknesses such that the layers comprising the first material are physically thinner than the layers comprising the second material. For example, the layers of the first material may have an average thickness less than the average thickness of the second material, or less than half of the average thickness of the second material. Such a construction may have beneficial anti-warp characteristics, since a majority of the overall thickness of the thick film multilayer reflector is made up of the isotropic material, which is more likely than the birefringent material to have isotropic thermal expansion characteristics.

For polarizing reflectors, it is advantageous for the difference in the index of refraction of the first and second light-transmissive materials in one in-plane direction to differ significantly in the finished polarizer, while the difference in the orthogonal in-plane index is minimized. If a first polymer has a large refractive index when isotropic, and is positively birefringent (that is, its refractive index increases in the direction of stretching), a second polymer will typically be chosen to have a matching refractive index, after processing, in the planar direction orthogonal to the stretching direction, and a refractive index in the direction of stretching which is as low as possible. Conversely, if the first polymer has a small refractive index when isotropic, and is negatively birefringent, the second polymer will typically be chosen to have a matching refractive index, after processing, in the planar direction orthogonal to the stretching direction, and a refractive index in the direction of stretching which is as high as possible. Alternatively, it is possible to select a first polymer that is positively birefringent and has an intermediate or low refractive index when isotropic, or one that is negatively birefringent and has an intermediate or high refractive index when isotropic. In these cases, the second polymer may typically be chosen so that, after processing, its refractive index matches that of the first polymer in either the stretching direction or the planar direction orthogonal to stretching. Further, the second polymer can be chosen such that the difference in index of refraction in the remaining in-plane direction is maximized, regardless of whether this is best accomplished by a very low or very high index of refraction in that direction.

In cases where the reflector is intended to reflect orthogonal polarization states of light equally, the refractive indices for any given layer in orthogonal in-plane directions are desirably nearly equal. It can be advantageous, however, for the in-plane indices of the first light-transmissive material to differ as greatly as possible from the in-plane indices of the second light-transmissive material. For this reason, if a first polymer has a high index of refraction when isotropic, it is advantageous that it also be positively birefringent. Likewise, if the first polymer has a low index of refraction when isotropic, it is advantageous that it also be negatively birefringent. The second polymer advantageously develops little or no birefringence when stretched, or develops birefringence of the opposite sense (positive-negative or negative-positive), such that its in-plane refractive indices differ as much as possible from those of the first polymer in the finished reflector. These criteria may be combined appropriately with those listed above for polarizers if the reflector is intended to have some degree of polarizing properties as well.

Absorbance is another consideration. For most applications, it is advantageous for neither the first nor the second light-transmissive material to have any absorbance bands within the bandwidth of interest for the reflector in question. Thus, all incident light within the bandwidth is either reflected or transmitted. However, for some applications, it may be useful for one or both of the first and second polymer to absorb specific wavelengths, either totally or in part.

Although many polymers may be chosen as the first polymer, certain of the polyesters have the capability for particularly large birefringence. Among these, polyethylene 2,6-naphthalate (PEN) can be chosen as a first polymer for the disclosed reflectors. It has a very large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. In practice, this restriction imposes an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornene and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications.

When a naphthalene dicarboxylic polyester such as PEN or PBN is chosen as first polymer, there are several approaches which may be taken to the selection of a second polymer. An approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids maybe used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Polycarbonates having a glass transition temperature compatible with that of PEN and having a refractive index similar to the isotropic refractive index of PEN can also be useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include: polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyetheramides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (including polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly(4-methyl)pentene), fluorinated polymers and copolymers (such as polytetrafluoroethylene, polytrifluoroethylene, polyvinylidene fluoride, polyvinyl fluoride, fluorinated ethylene-propylene copolymers, perfluoroalkoxy resins, polychlorotrifluoro ethylene, polyethylene-co-tri fluoro ethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non-naphthalene group-containing copolyesters which may be formulated from the above lists of suitable polyester comonomers for PEN. In some applications, especially when PET serves as the first polymer, copolyesters based on PET and comonomers from said lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

Another family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly(aryl styrene)s, poly (styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly(phenyl styrene). As for the poly(styrene halide)s, examples include the isomers of the following: poly(chlorostyrene), poly(bromostyrene), and poly(fluorostyrene). Examples of poly (alkoxy styrene)s include the isomers of the following: poly(methoxy styrene) and poly(ethoxy styrene). Among these examples, particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile).

When a polarizer is made using a process with predominantly uniaxial stretching, suitable combinations of polymers for optical layers include PEN/coPEN, PET/coPET, PEN/sPS, PET/sPS, PEN/Eastar™, and PET/Eastar™, where "coPEN" refers to a copolymer or blend based upon naphthalene dicarboxylic acid (as described above) and Eastar™ is a polyester or copolyester (believed to comprise cyclohexanedimethylene diol units and terephthalate units) commercially available from Eastman Chemical Company. When a polarizer is to be made by manipulating the process conditions of a biaxial stretching process, suitable combinations of polymers for individual layers include PEN/coPEN, PEN/PET, PEN/PBT, PEN/PETG and PEN/PET-coPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

Suitable polymer combinations for individual layers in the case of mirror reflectors include PEN/PMMA, PET/PMMA, PEN/Ecdel™, PET/Ecdel™, PEN/sPS, PET/sPS, PEN/co-PET, PEN/PETG, and PEN/THV™, where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., "coPET" refers to a copolymer or blend based upon terephthalic acid (as described above), "PETG" refers to a copolymer of PET employing a second glycol (usually cyclohexanedimethanol), and THV™ is a fluoropolymer commercially available from 3M Co.

For some reflectors, a match of the refractive indices of the first and second light-transmissive materials in the thickness or z-direction is sometimes preferred, because it provides for constant reflectance with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer, its refractive index at the same wavelength, in all three directions, might be 1.495. Another example is the PET/Ecdel™ system, in which the analogous indices might be 1.66 and 1.51 for PET, while the isotropic index of Ecdel™ might be 1.52. The relevant property is that the normal-to-plane index for one material is closer to the in-plane indices of the other material than to its own in-plane indices.

In other embodiments, a deliberate mismatching of the normal-to-plane refractive index is desirable. Some examples include those involving three or more polymeric layers in the optical stack in which a deliberate mismatch in the normal-to-plane index is desirable opposite in sign to the index mismatch in one of the in-plane directions. In some cases it is desirable for the multilayer reflectors to consist of more than two distinguishable polymers or other light-transmissive materials. A third or subsequent polymer, for example, might be fruitfully employed as an adhesion-promoting layer between the first polymer and the second polymer within a layered stack, as an additional component in a stack for optical purposes, as a protective boundary layer, as a skin layer, as a functional coating, or for any other purpose. As such, the composition of a third or subsequent polymer, if any, is not limited. Some suitable multicomponent constructions are described in U.S. Pat. No. 6,207,260 (Wheatley et al.).

Unless otherwise indicated, all numbers expressing feature sizes, amounts, and physical properties used in the specification and claims are to be understood as being modified by the term "about." Accordingly, unless indicated to the contrary, the numerical parameters set forth in the present specification and claims are approximations that can vary depending upon the desired properties sought to be obtained by those skilled in the art utilizing the teachings disclosed herein.

Various modifications and alterations of this invention will be apparent to those skilled in the art without departing from the scope and spirit of this invention, and it should be understood that this invention is not limited to the illustrative embodiments set forth herein. All U.S. patents, patent applications, and other patent and non-patent documents referred to herein are incorporated by reference, to the extent they are not inconsistent with the foregoing disclosure.

What is claimed is:

1. A multilayer reflector that substantially reflects light over the visible spectrum for at least one polarization state, the reflector comprising:

a stack of light-transmissive polymer layers comprising at least a first and second alternating polymer material, the first and second materials having different refractive indices along at least one in-plane axis, the polymer layers having an average optical thickness of at least about $2\lambda_0$, where $\lambda_0$ is a visible wavelength of interest, the polymer layers contributing substantially to the reflectivity of the multilayer reflector;

wherein the polymer layers in the stack have a non-linear distribution of optical thicknesses along a thickness axis of the reflector.

2. The reflector of claim 1, wherein the distribution of optical thicknesses is selected to decrease variability in reflection or transmission over visible light wavelengths.

3. The reflector of claim 1, wherein the distribution of optical thicknesses is selected to decrease variability in reflection of normally incident light of the at least one polarization state over visible light wavelengths.

4. The reflector of claim 1, wherein the non-linear distribution includes a randomized distribution.

5. The reflector of claim 1, wherein the polymer layers have an average optical thickness of about $10\lambda_0$ or less.

6. The reflector of claim 5, wherein the polymer layers have an average optical thickness of about $5\lambda_0$ or less.

7. The reflector of claim 1, wherein the first polymer material is substantially birefringent and the second polymer material is substantially isotropic.

8. The reflector of claim 7, wherein the polymer layers of the first material are thinner than the polymer layers of the second material.

9. The reflector of claim 1, wherein the refractive index difference along an in-plane x-axis is $\Delta n_x$ and a refractive index difference along an in-plane y-axis perpendicular to the x-axis is $\Delta n_y$, and where $|\Delta n_x| \approx |\Delta n_y|$.

10. The reflector of claim 1, wherein the refractive index difference along an in-plane x-axis is $\Delta n_x$ and a refractive index difference along an in-plane y-axis perpendicular to the x-axis is $\Delta n_y$, and where $|\Delta n_x| > |\Delta n_y|$.

11. The reflector of claim 10, wherein $|\Delta n_y|$ is 0 or no greater than 0.01.

12. The reflector of claim 11, wherein the refractive index difference along a z-axis perpendicular to both the x- and y-axes is $\Delta n_z$, and $|\Delta n_z|$ is 0 or no greater than 0.01.

13. The reflector of claim 11, wherein the refractive index difference along a z-axis perpendicular to both the x- and y-axes is $\Delta n_z$, and $|\Delta n_z| > |\Delta n_y|$.

14. The reflector of claim 13, wherein the distribution of optical thicknesses is selected to decrease variability in transmission of p-polarized light obliquely incident in the y-z plane over visible light wavelengths.

15. The reflector of claim 1, wherein the reflector has an overall thickness of less than 1 mm.

16. The reflector of claim 1, wherein the reflector has an overall thickness of at least 1 mm.

17. The reflector of claim 1 in combination with at least one light source illuminating the reflector, the light source emitting light in at least one narrow emission peak.

18. A display comprising the reflector of claim 1.

19. The display of claim 18, wherein the reflector is a reflective polarizer.

20. The reflector of claim 1, wherein the non-linear distribution includes a non-uniform distribution.

21. The reflector of claim 20, wherein the non-linear distribution includes a randomized distribution.

22. The reflector of claim 20, wherein the non-linear distribution includes an irregular distribution.

23. The reflector of claim 20, wherein the non-linear distribution includes a mixed distribution.

24. A multilayer reflector that substantially reflects light over the visible spectrum for at least one polarization state, the reflector comprising:

a stack of light-transmissive polymer layers comprising at least a first and second alternating polymer material, the first and second materials having different refractive indices along at least one in-plane axis, the polymer layers having an average optical thickness of at least about $(5/4)\lambda_0$, where $\lambda_0$ is a visible wavelength of interest, the polymer layers contributing substantially to the reflectivity of the multilayer reflector;

wherein the polymer layers in the stack have a non-uniform distribution of optical thicknesses along a thickness axis of the reflector;

wherein the first polymer material is substantially birefringent and the second polymer material is substantially isotropic; and wherein the polymer layers of the first material are thinner than the polymer layers of the second material.

25. A multilayer reflector that substantially reflects light over the visible spectrum for at least one polarization state, the reflector comprising:

a stack of light-transmissive polymer layers comprising at least a first and second alternating polymer material, the first and second materials having different refractive indices along at least one in-plane axis, the polymer layers having an average optical thickness of at least about $(5/4)\lambda_0$, where $\lambda_0$ is a visible wavelength of interest, the polymer layers contributing substantially to the reflectivity of the multilayer reflector;

wherein the polymer layers in the stack have a non-uniform distribution of optical thicknesses along a thickness axis of the reflector;

wherein the refractive index difference along an in-plane x-axis is $\Delta n_x$ and a refractive index difference along an in-plane y-axis perpendicular to the x-axis is $\Delta n_y$, and where $|\Delta n_x| > |\Delta n_y|$.

26. The reflector of claim 25, wherein $|\Delta n_y|$ is 0 or no greater than 0.01.

27. The reflector of claim 26, wherein the refractive index difference along a z-axis perpendicular to both the x- and y-axes is $\Delta n_z$, and $|\Delta n_z|$ is 0 or no greater than 0.01.

28. The reflector of claim 26, wherein the refractive index difference along a z-axis perpendicular to both the x- and y-axes is $\Delta n_z$, and $|\Delta n_z| > |\Delta n_y|$.

29. The reflector of claim 28, wherein the distribution of optical thicknesses is selected to decrease variability in transmission of p-polarized light obliquely incident in the y-z plane over visible light wavelengths.

30. A multilayer reflector that substantially reflects light over the visible spectrum for at least one polarization state, the reflector comprising:
- a stack of light-transmissive polymer layers comprising at least a first and second alternating polymer material, the first and second materials having different refractive indices along at least one in-plane axis, the polymer layers having an average optical thickness that is greater than a maximum wavelength of light in the visible spectrum, the polymer layers contributing substantially to the reflectivity of the multilayer reflector;
- wherein the polymer layers in the stack have a non-linear distribution of optical thicknesses along a thickness axis of the reflector.

31. The reflector of claim 30, wherein the non-linear distribution includes a non-uniform distribution.

32. A multilayer reflector that substantially reflects light over the visible spectrum for at least one polarization state, the reflector comprising:
- a stack of light-transmissive polymer layers comprising at least a first and second alternating polymer material, the first and second materials having different refractive indices along at least one in-plane axis, the polymer layers having an average optical thickness of at least about $2\lambda_0$, where $\lambda_0$ is a visible wavelength of interest, the polymer layers contributing substantially to the reflectivity of the multilayer reflector;
- wherein the polymer layers in the stack have a non-uniform distribution of optical thicknesses along a thickness axis of the reflector;
- wherein the refractive index difference along an in-plane x-axis is $\Delta n_x$ and a refractive index difference along an in-plane y-axis perpendicular to the x-axis is $\Delta n_y$, and where $|\Delta n_x| \approx |\Delta n_y|$.

* * * * *

UNITED STATES PATENT AND TRADEMARK OFFICE
CERTIFICATE OF CORRECTION

PATENT NO. : 7,385,763 B2 Page 1 of 1
APPLICATION NO. : 11/109212
DATED : June 10, 2008
INVENTOR(S) : Timothy J. Nevitt It is certified that error appears in the above-identified patent and that said Letters Patent is hereby corrected as shown below:

Column 5
Line 47, Delete "A,B," and insert -- A, B, --, therefor.
Line 66, Delete "N,N+1," and insert -- N, N+1, --, therefor.

Column 11
Line 43, After "-0.10" insert -- . --.

Column 12
Line 59, After "(COV" insert -- = --.

Column 13
Line 56, Delete "Mulitlayer" and insert -- Multilayer --, therefor.

Column 14
Line 6, Delete "Mulitlayer" and insert -- Multilayer --, therefor.
Line 30, Delete "Mulitlayer" and insert -- Multilayer --, therefor.

Column 21
Line 19, Delete "pheneanthrene" and insert -- phenanthrene --, therefor.

Signed and Sealed this

Twenty-first Day of October, 2008

JON W. DUDAS
*Director of the United States Patent and Trademark Office*